(12) United States Patent
Panzo et al.

(10) Patent No.: US 10,748,126 B2
(45) Date of Patent: Aug. 18, 2020

(54) SYSTEM AND METHODS FOR DIGITAL CHANGE TRANSACTIONS

(71) Applicant: POCKIT, LLC, Baldwin Park, FL (US)

(72) Inventors: Matthew Panzo, Eustis, FL (US); Steve Shamrock, Eustis, FL (US); Christian Thomas Chicles, Orlando, FL (US); Lydia Chicles, Orlando, FL (US); David Michael Booth, Deltona, FL (US); David Robert Newman, Dunnellon, FL (US)

(73) Assignee: POCKIT, LLC, Baldwin Park, FL (US)

( * ) Notice: Subject to any disclaimer, the term of this patent is extended or adjusted under 35 U.S.C. 154(b) by 612 days.

(21) Appl. No.: 15/285,438

(22) Filed: Oct. 4, 2016

(65) Prior Publication Data
US 2018/0096325 A1 Apr. 5, 2018

(51) Int. Cl.
*G06Q 20/20* (2012.01)
*G06Q 20/32* (2012.01)
*G06Q 20/10* (2012.01)

(52) U.S. Cl.
CPC ......... *G06Q 20/20* (2013.01); *G06Q 20/3223* (2013.01); *G06Q 20/10* (2013.01)

(58) Field of Classification Search
CPC ..... G06Q 20/20; G06Q 20/10; G06Q 20/3223
See application file for complete search history.

(56) References Cited

U.S. PATENT DOCUMENTS

| | | | |
|---|---|---|---|
| 6,112,191 A * | 8/2000 | Burke | G06Q 20/04 235/375 |
| 9,445,220 B2 * | 9/2016 | Granbery | H04W 4/21 |
| 10,304,051 B2 * | 5/2019 | Laracey | G06Q 20/3278 |
| 10,332,094 B2 * | 6/2019 | Aabye | G06Q 20/10 |
| 2005/0080737 A1 | 4/2005 | Stein et al. | |
| 2010/0145860 A1 * | 6/2010 | Pelegero | G06Q 20/12 705/71 |
| 2013/0048717 A1 * | 2/2013 | Brendell | G06Q 20/325 235/380 |

(Continued)

OTHER PUBLICATIONS

U.S. Appl. No. 62/495,873, filed Sep. 26, 2016 Francis N. Hwang.
U.S. Appl. No. 62/495,861, filed Sep. 26, 2016 Francis N. Hwang.
U.S. Appl. No. 62/495,871, filed Sep. 26, 2016 Francis N. Hwang.

*Primary Examiner* — Florian M Zeender
*Assistant Examiner* — Whitney Poffenbarger
(74) *Attorney, Agent, or Firm* — Allen, Dyer, Doppelt + Gilchrist, P.A. Attorneys at Law

(57) ABSTRACT

A system for converting physical coins into digital currency at a point of sale during a cash transaction at a retailer and related methods. A mobile app residing on a customer's mobile device communicates with a control module to manage the customer's account and obtain an identifier associated with the customer's account. During a cash transaction where physical change is due, the mobile device transmits the identifier to the point of sale. The point of sale transmits the identifier and the amount of change due to the control module. The control module confirms the identity of the customer using the identifier and directs a financial institution to move the amount of change due from the retailer's bank account to one or more designated bank accounts, one of which may be the customer's bank account.

24 Claims, 20 Drawing Sheets

(56) References Cited

U.S. PATENT DOCUMENTS

2013/0132217 A1* 5/2013 Yahn ................. G07F 17/26
   705/17
2018/0165661 A1* 6/2018 Macht ............... G06Q 20/4014

* cited by examiner

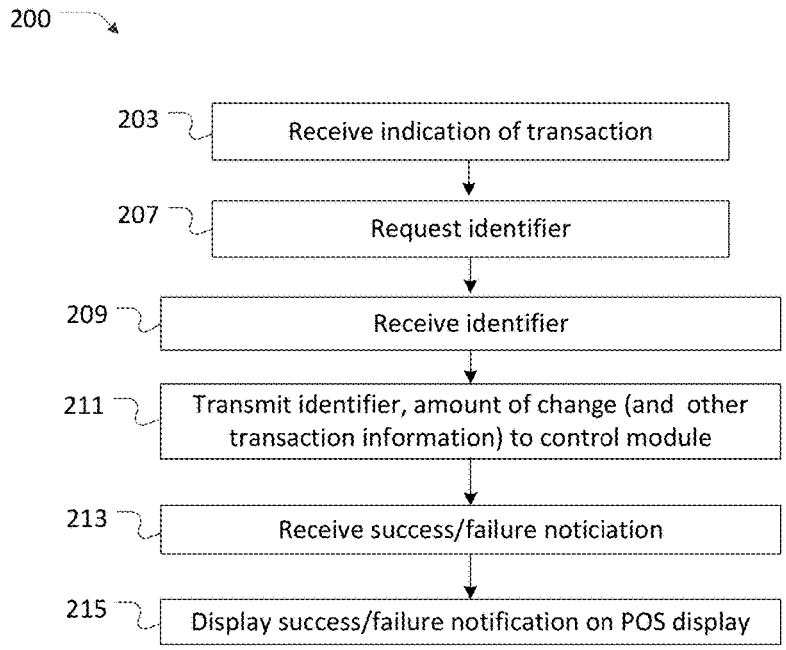
FIG. 5A
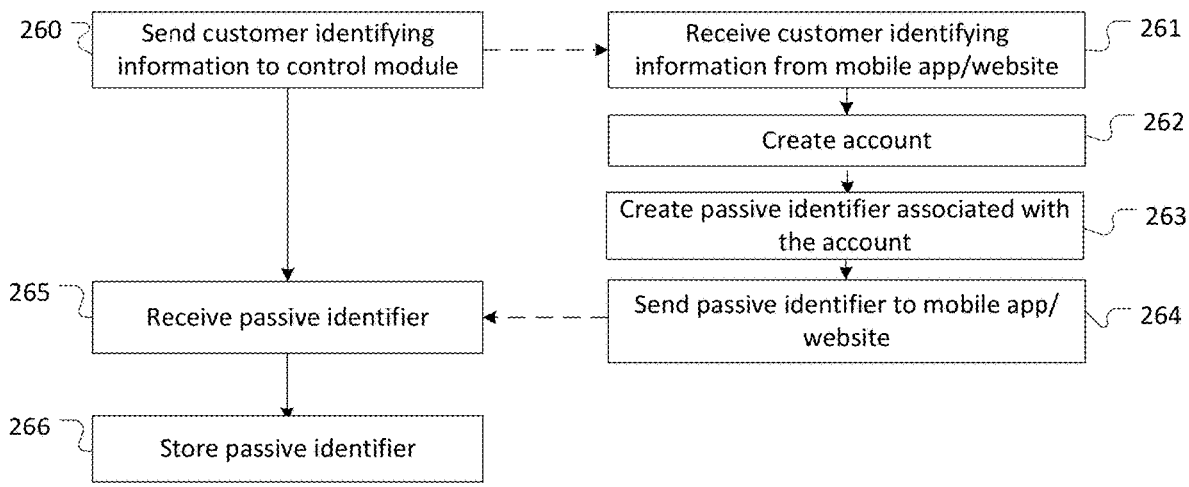
FIG. 5B
FIG. 5C

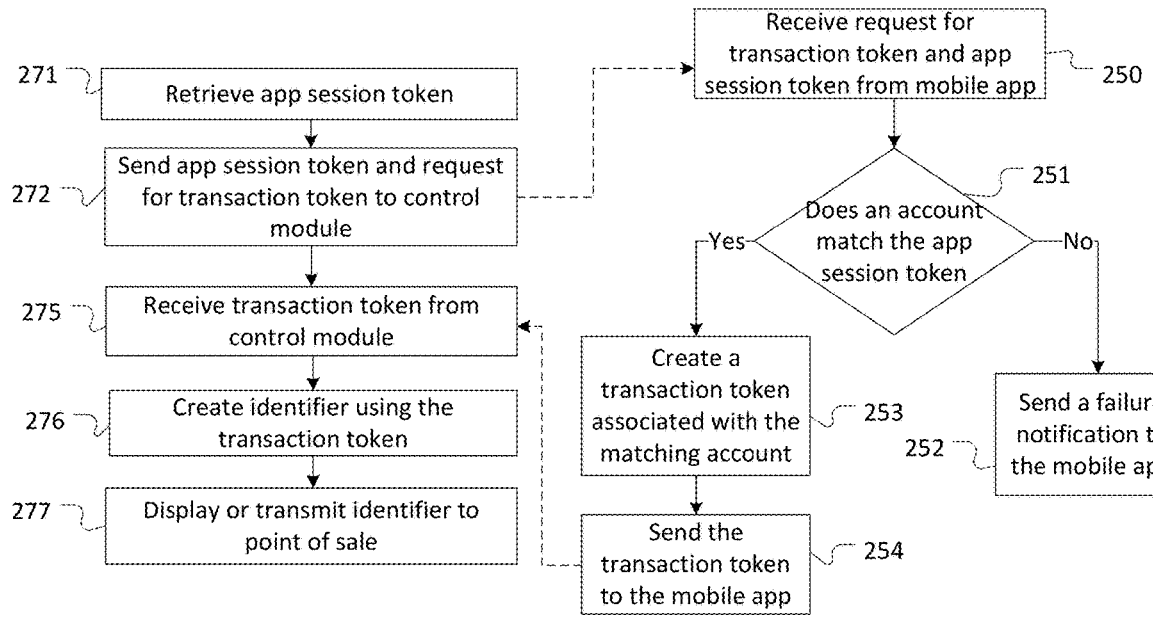
FIG. 6A  FIG. 6B
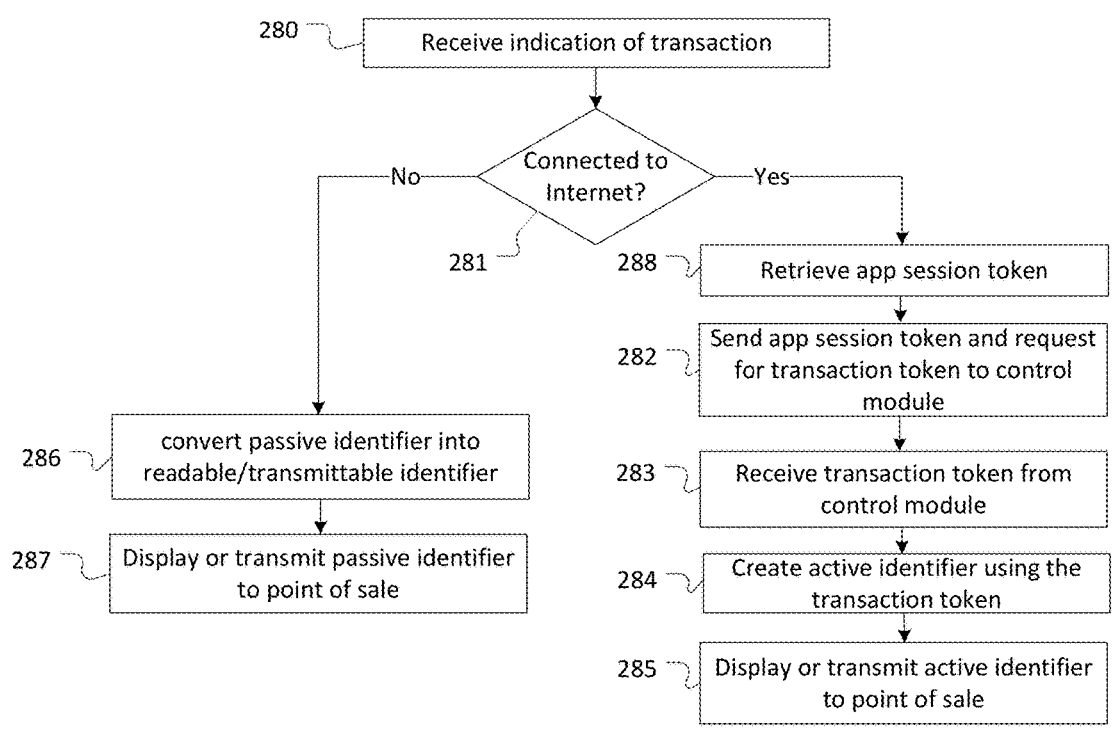
FIG. 7

SYSTEM AND METHODS FOR DIGITAL CHANGE TRANSACTIONS

FIELD OF INVENTION

The present disclosure generally relates to digital currency; more specifically, to a method and system for converting physical coins into digital currency at a point of sale.

BACKGROUND

When paying for an item with cash at a point of sale, a customer is generally provided with one or more coins as part of his/her change for the transaction. Carrying around change can weigh down pockets and purses and can become an annoyance, especially in large amounts. Often times, customers stockpile change to avoid carrying it around. This stockpiled change must then be taken to the bank to exchange for paper bills or for deposit in one's bank account. Alternatively, the change can be taken to a coin exchange kiosk, where one's change can be exchanged for a voucher. That voucher can then be redeemed for cash (less a transaction fee). Alternatively, the change can be exchanged for a gift card or can be donated to charity at the coin exchange kiosk. Collecting, carrying, storing and transporting change can be a rigorous, tedious, time consuming and inefficient process. What is needed in the art is a system that provides for simple collection and management of one's change without the use of physical coins.

SUMMARY

In accordance with the teachings disclosed herein, embodiments related to a system and methods for converting physical coins into digital currency at a point of sale at a retailer are disclosed.

In an embodiment, a system for converting physical coins into digital currency at a point of sale at a retailer comprises a mobile app residing on a mobile device, a point of sale located at a retailer and a control module located remotely from the retailer. The point of sale is in wireless communication with the mobile app and receives an identifier from the mobile app. The point of sale also determines the amount of change due for the cash transaction. The control module is in communication with the mobile app and the point of sale. The control module receives the amount of change due for the cash transaction and the identifier from the point of sale. It then determines if the identifier is valid and matches the identifier to a customer account residing on the control module. The control module is also in communication with a financial institution. If the identifier is valid and matches a customer account, the control module instructs the financial institution to move the amount of the change due for the cash transaction from a first bank account, which may be the retailer's bank account, to one or more destination bank accounts. The control module may provide instructions to move the amount of change due based on preferences designated in the matched customer account. The one or more destination bank account may be a bank account owned by the customer or a partner organization. The one or more destination bank accounts may also include a transaction fee account. The identifier provided by the mobile app may have originally been created by the control module and transmitted to the mobile app.

In another embodiment, a method of processing a digital change transaction during a cash transaction at a point of sale comprises a plurality of operations performed by a control module. The control module receives transaction information comprising an identifier, which may be a passive identifier or an active identifier, and an amount of change due for the cash transaction from the point of sale. The transaction information may further comprise the total amount of the transaction, the items purchased in the transaction, the number of items purchased in the transaction, the date of the transaction, time of transaction, the cost of items purchased in the transaction, the types of payments used in the transaction and the amounts paid using each type of payment. The control module may store the transaction information. The control module determines if the identifier is valid. The determination of the validity of the identifier may comprise comparing the identifier to a plurality of customer identifiers, each of which is associated with a customer account, to locate a matching customer account. If the identifier is an active identifier, the determination may also comprise determining if a pre-determined time limit associated with the identifier has expired. If the identifier in invalid, the control module may transmit a failure notification to the point of sale. If the identifier is valid, the control module determines how the amount of change should be distributed. This determination may be made in accordance with one or more preferences designated in the matching customer account. The determination may also made by comparing the items purchased in the transaction to a plurality of available discounts. The control module then transmits instructions to move the amount of the change (and if present, the amount of the discount) from a first bank account, which may be a retailer's bank account, to one or more destination bank accounts. The one or more destination bank accounts may be a bank account owned by the customer or by a partner organization. The one or more destination banks may also include a transaction fee account.

In another embodiment, a method of processing a digital change transaction during a cash transaction at a point of sale comprises a plurality of operations performed by the point of sale. The point of sale receives an indication of the digital change transaction and then receives an identifier. Receiving the identifier may comprise scanning the identifier by a scanner or receiving the identifier by a wireless receiver. The point of sale determines the amount of change due to a customer for the cash transaction and then transmits the identifier and the amount of change due to a control module. The point of sale receives a notification from the control module indicating the success or failure of the transfer of the amount of change due from a first bank account to one or more destination bank accounts and displays the notification.

BRIEF DESCRIPTION OF THE DRAWINGS

FIG. 5A is a flowchart of a method of converting physical coins into digital currency performed by a point of sale according to an embodiment of the present invention.

FIG. 5B is a flowchart of a method of obtaining a passive identifier performed by a mobile app or website according to an embodiment of the present invention.

FIG. 5C is a flowchart of a method of creating a passive identifier performed by a control module according to an embodiment of the present invention.

FIG. 6A is a flowchart of a method of obtaining an active identifier for a digital change transaction performed by a mobile app or website according to an embodiment of the present invention.

FIG. 6B is a flowchart of a method of creating an active identifier for a digital change transaction performed by a control module according to an embodiment of the present invention.

FIG. 7 is a flowchart of a method of obtaining and displaying/transmitting an identifier performed by a mobile app or website according to an embodiment of the present invention.

DETAILED DESCRIPTION OF THE PREFERRED EMBODIMENTS

A detailed description of the embodiments for a method and system for converting physical coins into digital currency at a point of sale will now be presented with reference to FIGS. 1-19B. One of skill in the art will recognize that these embodiments are not intended to be limitations on the scope, and that modifications are possible without departing from the spirit thereof. In certain instances, well-known methods, procedures, components, and circuits have not been described in detail.

Figure 1:
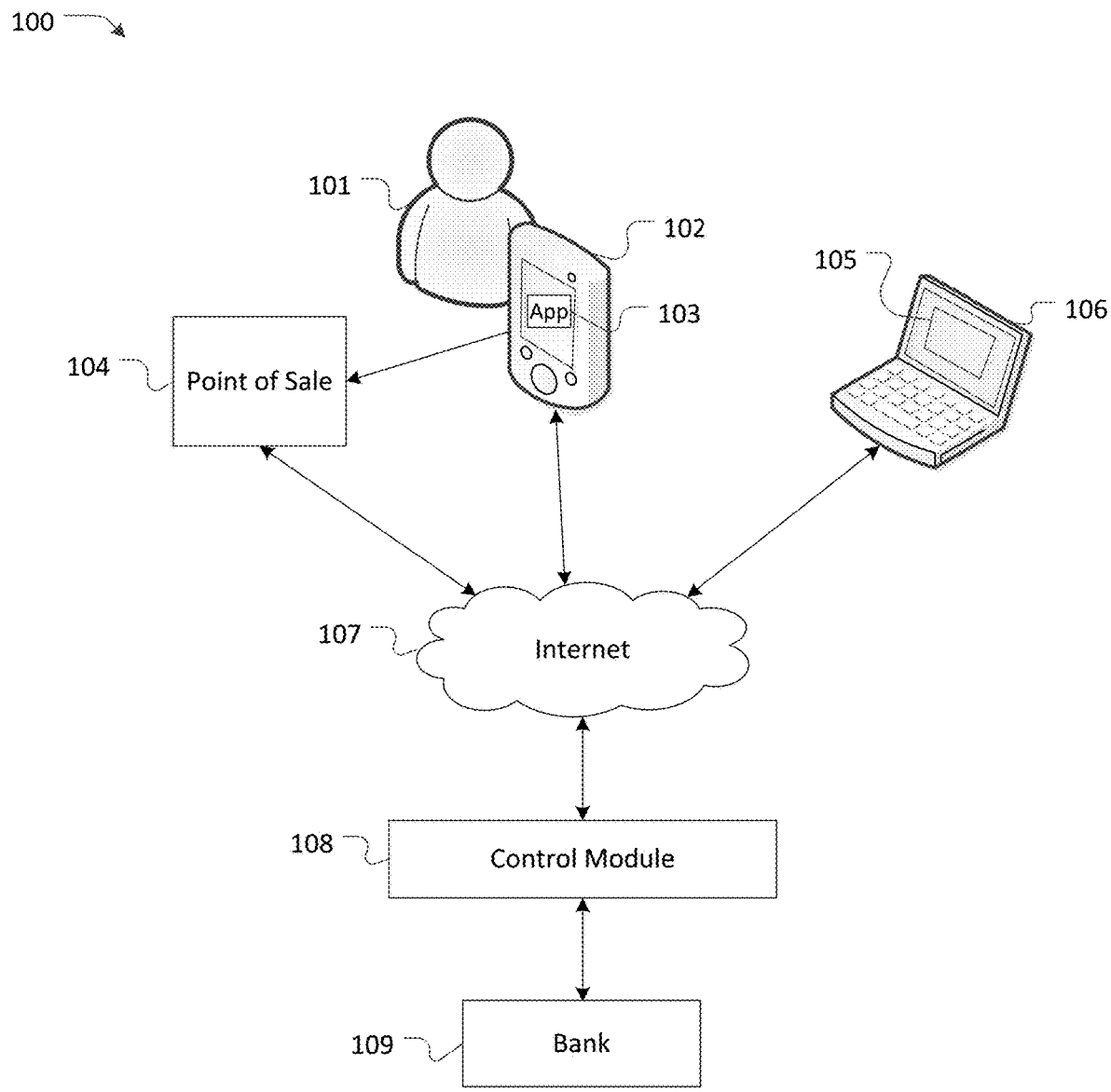
FIG. 1 is a block diagram of a system for converting physical coins into digital currency according to an embodiment of the present invention.

An embodiment of a system (system 100) for converting physical coins into digital currency at a point of sale is shown in the diagram of FIG. 1. System 100 can be used to provide customer 101 having mobile device 102, who is paying cash for a purchase at point of sale 104, with digital change, rather than physical coins.

System 100 comprises control module 108, point of sale 104 and mobile app 103. Control module 108 is in two-way communication with point of sale 104, via Internet 107. Point of sale 104 is located at a retailer. Control module 108 may be located remotely from retailer and may be in communication with other point of sale devices at the retailer or with point of sale devices at other retailers. Control module 108 is also in two-way communication with mobile app 103 residing on mobile device 102, via Internet 107. Although not shown here, control module 108 may also be in communication with numerous other mobile apps. Mobile device 102 and mobile app 103 are associated with consumer 101. Mobile device 102 may be in communication with point of sale 104. Control module 108 is in two-way communication with website 105, which may be accessed on an electronic device, such as, for example, computer 106, via Internet 107. Control module 108 is also in two-way communication with electronic devices associated with one or more banks or financial institutions or services, which are represented here by bank 109.

Figure 2:
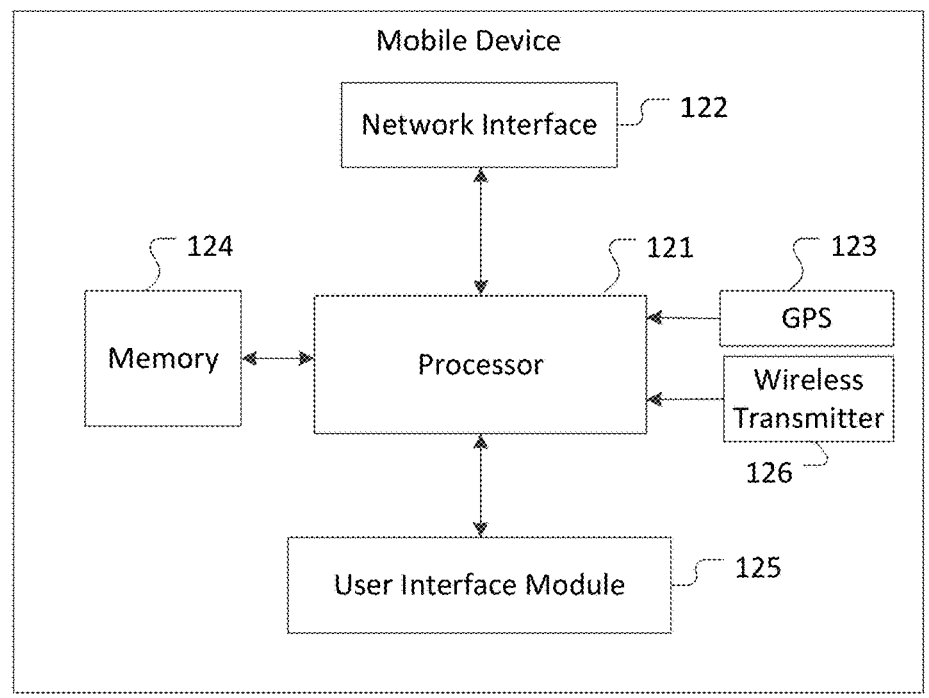
FIG. 2 is a block diagram of a mobile device according to an embodiment of the present invention.

FIG. 2 is a diagram illustrating mobile device 102 of an exemplary embodiment. Mobile device 102 comprises an electronic computing device. This electronic computing device is illustrative of an electronic computing device that could benefit from embodiments of the invention and, therefore, should not be taken to limit the scope of the invention. In addition, the example embodiment described need not be the entire electronic computing device, but may be a component or group of components of the electronic computing device in other example embodiments. While one embodiment of the electronic computing device is illustrated for purposes of example, other types of electronic computing devices, such as, but not limited to, mobile phones, portable digital assistants (PDAs), tablets, mobile computing devices, desktop computers, televisions, gaming devices, laptop computers, media players, and other types of electronic systems, may readily employ embodiments of the invention. Moreover, the apparatus of an example embodiment need not be the entire electronic device, but may be a component or group of components of the electronic device in other example embodiments. Furthermore, devices may readily employ embodiments of the invention regardless of their intent to provide mobility. In this regard, even though embodiments of the invention are described in conjunction with a mobile device, it should be understood that embodiments of the invention may be utilized in conjunction with a variety of other electronic devices.

As shown, mobile device 102 comprises processor 121 which includes functionality to execute software instructions, which may be stored in memory 124, and which may, among other things, cause processor 121 to implement embodiments described herein. Mobile device 102 comprises network interface 122 in communication with processor 121 that communicates, via the internet and/or a cellular network, with control module 108 (FIG. 1). Mobile device 102 may also comprise GPS 123 in communication with processor 121 to provide location coordinates of mobile device 102. Mobile device 102 also includes user interface module 125 to display information to and receive input from the user. Mobile device 102 may also comprise wireless transmitter 126, which may be, for example, a near field communication (NFC) transmitter or other radio frequency identification (RFID) transmitter, Bluetooth transmitter or other wireless transmitter. Wireless transmitter 126 may also be a wireless transceiver capable of both transmitting and receiving wireless signals. Wireless transmitter 126 may be in communication with point of sale 104.

Returning to FIG. 1, mobile app 103 residing on mobile device 102 can be used to view and manage digital change transactions and any digital change acquired by customer 101. Customer 101 can also use mobile app 103 to set up a user account. Website 105 may also be used to manage digital change transaction, manage any digital change acquired by customer 101 and setup accounts. Customer 101 may access website 105 either on mobile device 102 or on another electronic device, such as for example computer 106, via Internet 107.

Prior to attempting a digital change transaction, or in some cases after completing one or more limited digital change transactions, customer 101 may use mobile app 103 or website 105 to setup a user account. During setup of the account, customer 101 may enter identifying information, which may include a unique username, password, name, address, phone number, and/or email address, in mobile app 103 or website 105, which will transmit the information to control module 108 where it is stored. Customer 101 may also enter his/her bank account information, such as, for example, bank routing number and bank account number. Customer 101 may enter information for more than one bank account. The customer may also select partner organizations, such as charitable organization, to receive all or a portion of his/her digital change. The percentages of each digital change transaction or accumulated digital change that should be distributed to each partner organization and/or to each of customer's bank accounts can also be entered. All bank, partner and distribution amounts are transmitted to and stored by control module 108.

Upon setup of each account, control module 108 may create a passive identifier and associate it with the account. The passive identifier is unique for each account. The passive identifier may be transmitted, via Internet 107, to and stored by mobile app 103. The identifier may be in the form of numerical text, bar code, QR code, or RFID, or convertible to such form by mobile app 103.

Once customer 101 has set up an account, customer 101 can log into his/her account on mobile app 103 or website 105. The login credentials are transmitted to control module 108, which validates their credentials. Once validated, control module 108, creates app session token associated with customer 101's account and transmits the app session token to mobile app 103. Mobile app 103 stores the app session token and uses it when sending a request to control module 108. Control module 108 identifies customer 101's account using the app session token.

Figure 3:
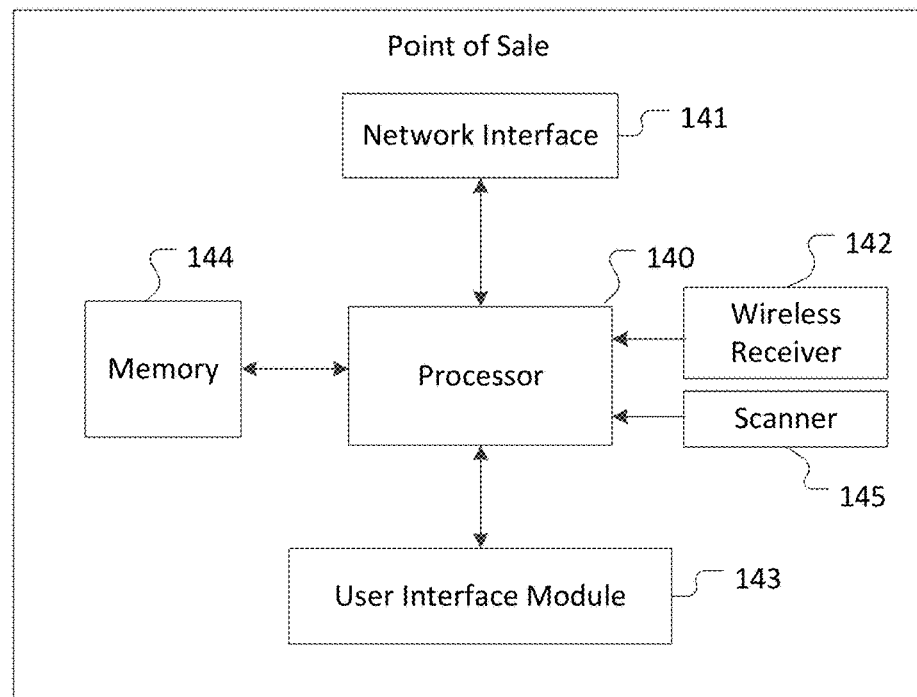
FIG. 3 is a block diagram of a point of sale according to an embodiment of the present invention.

FIG. 3 is a diagram illustrating point of sale 104 of an exemplary embodiment. Point of sale 104 comprises an electronic computing device adapted for receiving and processing payments at a retailer. This electronic computing device is illustrative of an electronic computing device that could benefit from embodiments of the invention and, therefore, should not be taken to limit the scope of the invention. In addition, the example embodiment described need not be the entire electronic computing device, but may be a component or group of components of the electronic computing device in other example embodiments. While one embodiment of the electronic computing device is illustrated for purposes of example, other types of electronic computing devices, such as, but not limited to, mobile phones, portable digital assistants (PDAs), tablets, mobile computing devices, desktop computers, televisions, gaming devices, laptop computers, media players, and other types of electronic systems, may readily employ embodiments of the invention. Moreover, the apparatus of an example embodiment need not be the entire electronic device, but may be a component or group of components of the electronic device in other example embodiments.

As shown, point of sale 104 comprises processor 140 which includes functionality to execute software instructions, which may be stored in memory 144 and which may, among other things, cause processor 140 to implement embodiments described herein. Point of sale 104 comprises network interface 141 in communication with processor 140 that communicates, via Internet 107 (FIG. 1) and/or a cellular network, with control module 108 (FIG. 1). Point of sale 104 also includes user interface module 143, in communication with processor 140, to display information to and receive input from the user. Point of sale 104 may also comprise wireless receiver 142, which may be, for example, a near field communication (NFC) receiver/scanner or other radio frequency identification (RFID) receiver/scanner, Bluetooth receiver or other wireless receiver. Wireless receiver 126 may also be a wireless transceiver capable of both transmitting and receiving wireless signals. Wireless receiver 126 may be in communication with wireless transmitter 126 (FIG. 2) of mobile device 102 (FIGS. 1, 2). Point of sale 104 may also comprise scanner 145, which may be, for example, a barcode or QR code scanner. Scanner 145 may be in communication with user interface module (FIG. 2) of mobile device 102 (FIGS. 1, 2). Wireless receiver 142 and/or scanner 145 allow Mobile device 102 (FIG. 1) to transmit customer 101's (FIG. 1) identifier to point of sale 104 or point of sale 104 to scan/read customer 101's (FIG. 1) identifier from mobile device 102 (FIG. 1).

Figure 4A:
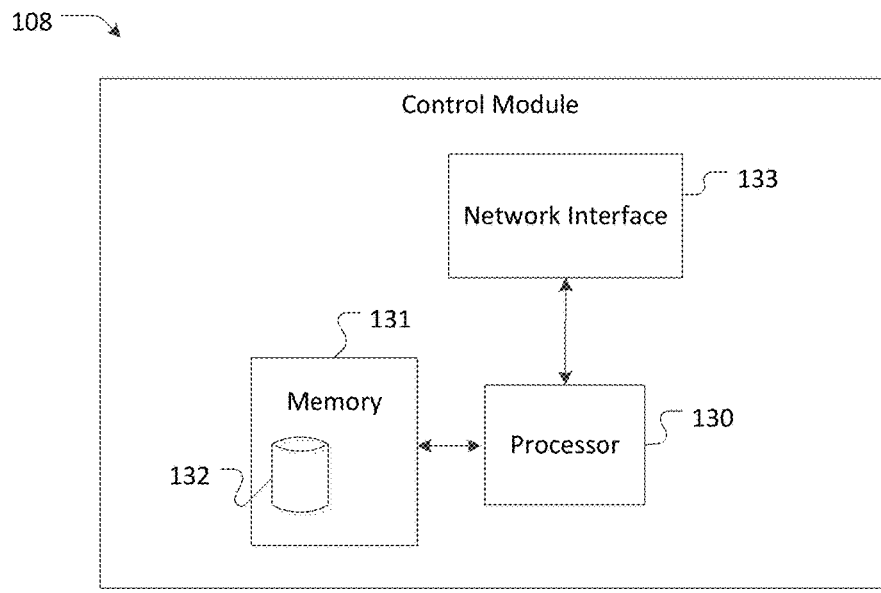
FIG. 4A is a block diagram of a control module according to an embodiment of the present invention.

FIG. 4A is a diagram illustrating control module 108 of an exemplary embodiment. Control module 108 may be a server or similar electronic computing device. It should be understood that the electronic computing device as illustrated and herein described is merely illustrative of an electronic computing device that could benefit from embodiments of the invention and, therefore, should not be taken to limit the scope of the invention. In addition, the apparatus of an example embodiment need not be the entire electronic computing device, but may be a component or group of components of the electronic computing device in other example embodiments.

Control module 108 comprises processor 130 that includes functionality to execute software instructions, which may be stored in memory 131, and which may, among other things, cause processor 130 to implement embodiments described herein. Database 132, which includes data used, added, deleted, and manipulated by embodiments described herein, may be stored in memory 131 and/or on disk.

Figure 4B:
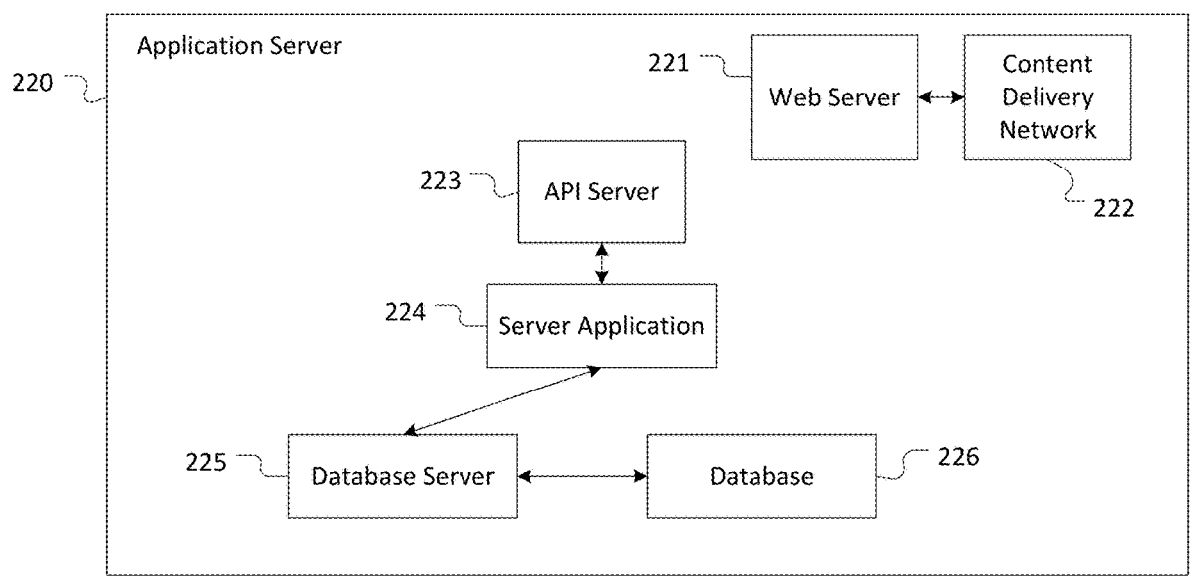
FIG. 4B is a block diagram of an application server according to an embodiment of the present invention.

In an embodiment, the control module is an application server as shown in FIG. 4B. In this embodiment, which is described with reference to elements shown in FIG. 1, application server 220 comprises web server 221, content delivery network 222, API server 223, server application 224, database server 225 and database 226. Web server 221, content delivery network 222 and API server 223 are in communication with mobile app 103 and website 105, via Internet 107. Web server 221, which provides static file hosting for website 105 and mobile app 103 related assets, is in communication with content delivery network 222, which is used for delivery of cached copies of files originating on web server 221. When a customer accesses website 105 or certain components of mobile app 103, static assets, such as documents, graphics, stylesheets and other web page related data, are delivered by content delivery network 222. Content delivery network 222 maintains copies of files hosted on web server 221. API server 223, which enables website 105 and mobile app 103 secure access to specific functionality on application server 220, is in communication with mobile app 103 and website 105 via Internet 107. Server application 224, which handles business logic, access to database server 225 and access to third party APIs, is in communication with API server 223. Database server 225, which handles direct access to database 226, is in communication with database 226. Database 226 stores user and feature related information. Mobile app 103 and website 105 make requests to API server 223 for all data and features that relate to business logic. API server 223 controls validation of the authenticity of requests and determines proper access to the requested resource before either rejecting a request or passing the request on to server application 224. Server application 224 evaluates the business function requested, which includes data that needs to be sent or fetched from database 226 as well as third-party APIs. Application server may also provide a standardized API interface such as representational state transfer (REST).

Figure 4C:
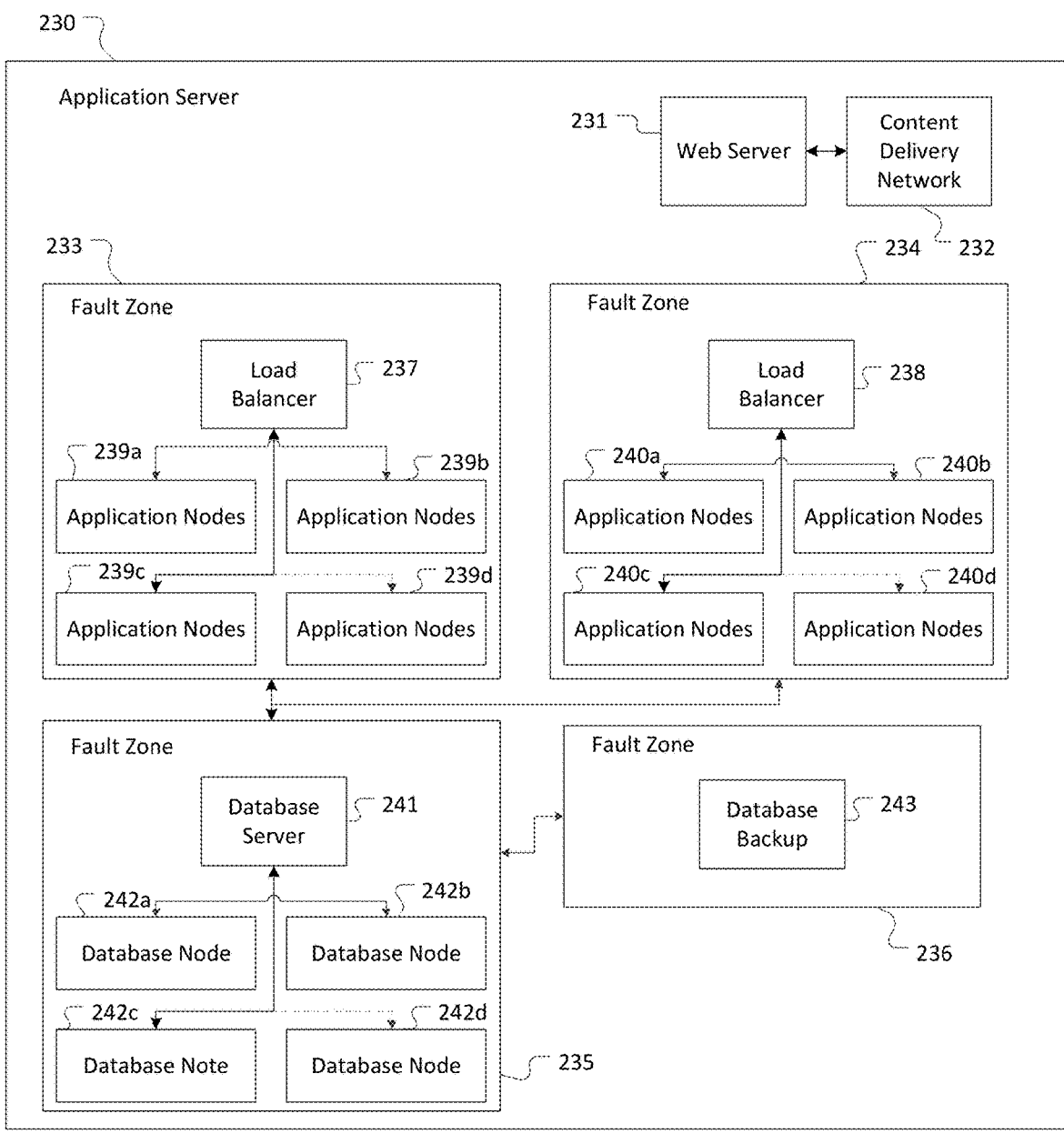
FIG. 4C is a block diagram of high availability and high redundancy setup of an application server according to an embodiment of the present invention.

In an embodiment, as shown in FIG. 4C, the application server is deployed in a high availability and high redundancy setup. In this embodiment, which is described with reference to elements shown in FIG. 1, application server 230 comprises web server 231, content delivery network 232, fault zone 233 comprising load balancer 237 and application nodes 239*a-d*, fault zone 234 comprising load balancer 238 and application nodes 240*a-d*, fault zone 235 comprising database server 241 and database nodes 242*a-d* and fault zone 236 comprising database backup 243. Web server 231, content delivery network 232 and load balancers 237 and 238 are in communication with mobile app 103 and website 105, via Internet 107. Web server 231, which is a static file hosting for website 105 and mobile app 103 related assets, is in communication with content delivery network 232, which is used for delivery of cached copies of files originating on web server 231. When a customer accesses website 105 or certain components of mobile app 103, static assets, such as documents, graphics, stylesheets and other web page related data is delivered by content delivery network 232. Content delivery network 232 maintains copies of files hosted on web server 231.

To increase availability, load balancers 237 and 238 and their corresponding application nodes 239*a*-239*d* and 240*a*-240*d* are grouped into fault zones 233 and 234. Similarly, database server 241 and its corresponding database nodes 242*a-d* and database backup 243 are segregated into fault zones 235 and 236, respectively. Each of fault zones 233-236 are located in geographically distinct locations and use isolated resources (hardware, power, internet, uplink, etc.). Although four fault zones are shown here, any number of fault zones can be implemented. Fault zones 233-236 may be operated at the same time. Mobile app 103 and website 105 are capable of switching between fault zones 233-234 in case of an outage in the fault zone currently in use. Although four application nodes are shown for each fault zone (application nodes 239*a-d* for fault zone 233 and application nodes 240*a-d* for fault zone 234) any number of application nodes can be used.

Application nodes 239*a*-239*d* and 240*a*-240*d* each comprise an API server and a server application executing as part of the same application. The API server enables website 105 and mobile app 103 secure access to specific functionality on application server 230. The server application handles business logic, access to database server 241 as well as access to third party APIs. Each of application nodes 239*a-d* and 240*a-d* are capable of serving requests. Load balancer 237 receives incoming requests and determines which of application nodes 239*a-d* is best suited to serve the request based on the health and availability of resources to each application node. Similarly, load balancer 238 receives incoming requests and determines which of application nodes 240*a-d* is best suited to serve the request based on the health and availability of resources to each application node. Mobile app 103 and website 105 make requests to the API server for all data and features related to business logic. The API server controls validation of the authenticity of requests and determines proper access to the requested resource before either rejecting the request or passing the request on to the server application. The server application evaluates the business function requested, which includes data that needs to be sent or fetched from database nodes 242*a-d* as well as third-party APIs.

Similar to load balancers 237 and 238, database server 241 receives incoming requests (from application nodes 239*a-d* and/or 240*a-d*) and determines which of database nodes 242*a-d* is best suited to serve the request; however, rather than making a determination for each request, database server 241 has a designated primary database node and all other database nodes operate in hot-standby/slave mode. Although four database nodes are shown for fault zone 235, any number of database nodes can be used. In case of a failure in the primary database node, database server 241 will elect the next primary database node. It is also possible for fault zone database server 241 and database nodes 242*a-d* to be in the same fault zone as one of load balancers 237 or 238. Database backup 243 is a non-hot-standby database backup in fault zone 236 that can be accessed periodically and/or as needed.

Returning to FIG. 1, in embodiments, customer accounts and data related to digital change transactions can be stored in control module 108. In addition, both mobile app 103 and website 105 can be used to create customer accounts and manage customer accounts on control module 108. Control module 108 receives customer 101's identifier and details of the cash sale (including the amount of change due to customer 101) sent from point of sale 104 during a digital change transaction. Control module 108 identifies customer 101 using the identifier and determines if a recipient account has been designated for receipt of digital change. Control module 108 can direct bank 109 to transfer the amount of the digital change from a digital change transaction from the retailer's bank account to customer 101's designated recipient account. Control module 108 may transmit a success/failure notification back to point of sale 104 indicating success or failure of the digital change transaction.

With continued reference to system 100's elements in FIG. 1, now turning to FIG. 5A, a flowchart that illustrates process 200 performed by point of sale 104 is provided. When customer 101 wishes to pay in cash and receive digital change, customer 101 or cashier working at point of sale 104 selects the digital change option provided on the user interface of point of sale 104. Upon receipt of an indication that a digital change transaction has been requested in operation 203, point of sale 104 attempts to identify customer 101. To do this, in operation 207, point of sale 104 requests an identifier, which may be a passive identifier or an active identifier, depending on the type of identification method used, as described in further detail below. When point of sale 104 receives an identifier, in operation 209, it then, in operation 211, transmits the identifier to control module 108 via internet 107 along with the amount of change, which point of sale 104 would have determined during its normal processing of customer 101's transaction. In operation 211, other information about customer 101's transaction such as, for example, total amount of purchase, item(s) purchased, number of items purchased, date of purchase, time of purchase, cost of item(s) purchased, type(s) of payments used (e.g. coupons, gift cards, credit cards, cash) and the amount(s) paid using such type(s) of payment(s), may also be transmitted to control module 108. Control module 108 will process the transaction as described below with reference to FIG. 8. Point of sale 104 will then receive a notification from control module 108 indicating whether the transfer of the digital change from the retailer's account to customer 101's designated account was successful in operation 213. Point of sale 104 may then display or other otherwise communicate to customer 101 or cashier whether the transaction succeeded or failed in operation 215. If point of sale 104 does not currently have communication with internet 107, a transaction record including the details of the transaction can be stored by point of sale 104 and transmitted once communication with internet 107 is restored.

As indicated above, there are two possible types of identification methods used to identify customer 101—a passive identification method and an active identification method. The type of identification method used may depend on the type of hardware available at point of sale 104 and on mobile device 102. The passive identifier is a static identifier and is unique for each customer. The passive identifier may be created by control module 108 during creation of the customer's account and serves to identify the customer's account. In embodiments, as shown in FIGS. 5B and 5C, the method of obtaining/creating a passive identifier is executed by mobile app 103 or website 105 (FIG. 5B) and control module 108 (FIG. 5C). Once customer 101 enters his/her identifying information in to mobile app 103 or website 105, mobile app 103 or website 105 sends the customer identifying information to control module 108 in operation 260. In operation 261, control module 108 receives the customer identifying information. Control module 108 creates an account in operation 262 and then, in operation 263, creates a passive identifier associated with the account. In operation 264, control module 108 sends passive identifier to mobile device 103 or website 105. After receiving the passive identifier in operation 265, mobile device 103 or website 105 store the passive identifier in operation 266. The passive identifier may be convertible to numerical text, to an optical machine readable representation, such as a bar code or QR code and/or to a communication frequency representation, such as RFID. Control module 108 can use the passive identifier to identify the customer's account. The passive identifier can be displayed on (in the case of a numerical code, bar code, QR code or similar representation) or transmitted by (in the case of RFID or similar representation) mobile device 103. Although mobile device 103 may be used to display or transmit the passive identifier, a mobile device is not required. A passive identifier in the form of a numerical code, bar code, QR code or similar representation may be printed on a membership card, keychain or even a piece of paper. The passive identifier can then be scanned to point of sale 104. Alternatively, in the case of a numerical code, customer 101 can manually enter the passive identifier into point of sale 104 or tell the cashier the passive identifier who can then enter it into point of sale 104. In the case of communication frequency representations, the transmitters, for example RFID tags, located in scanning cards, keychains or other similar items, can transmit the passive identifier to point of sale 104.

In embodiments, the active identification method creates a one time, short-lived transaction token that is used to identify customer 101. With continued reference to system 100's elements in FIG. 1, as shown in FIGS. 6A and 6B, active identification is executed by mobile app 103 (FIG. 6A) and control module 108 (FIG. 6B). Website 105 may also perform the method shown in FIG. 6 but with use of a web session token in place of the app session token. Mobile app 103 retrieves app session token in operation 271. Mobile app 103 then sends the app session token to control module 108 along with a request for a transaction token in operation 272. Control module 108 receives the request for the transaction token and the app session token from mobile app 103 in operation 250. Control module 108 determines, in operation 251, if an account existing on control module 108 has an app session token matching the app session token received from mobile app 103. If the received app session token does not match any app session token associated with any accounts, then, in operation 252, a failure notification is sent to mobile app 103. If the received app session token does match an app session token associated with an account, then, in operation 253, control module 108 creates a transaction token associated with the matching account. The transaction token is associated with customer 101's account and also identifies the time frame in which a transaction should occur. The transaction token may only be valid for a pre-defined time period following creation and this time period may be short (e.g. between 30 and 300 seconds), which may protect against fraudulent collections such as replay attacks and accidental double transactions. After this time period, the transaction token would expire. A transaction using the transaction token and occurring outside of this timeframe would be rejected by control module 108. In addition, once a transaction token is used, it expires. Therefore, repeated attempts to use the same transaction token will also fail. In operation 254, control module 108 sends the transaction token to mobile app 103. The transaction token is then received by mobile app 103 in operation 275. Then, in operation 276, the transaction token is used to create an identifier in the form an optical machine readable representation, such as a bar code or QR code and/or a wireless representation, such as RFID, including NFC, or other identifier transmittable by wireless means, such as Bluetooth or Wi-Fi. The active identifier can then, in operation 271, in the case of optical machine readable representations of the identifier, be displayed so it can be scanned by point of sale 104. Alternatively, in operation 277, in the case of wireless identifiers, mobile app 103 may cause mobile device 102 to transmit the active identifier to point of sale 104.

An embodiment of obtaining and displaying/transmitting an identifier using mobile device 102 is shown in FIG. 7 and is discussed with reference to elements in FIG. 1. The method may also be performed by website 105. When customer 101 creates his/her account with mobile app 103 or associates an existing account with mobile app 103, mobile app 103 receives a passive identifier from control module 108, which is stored in the mobile app 103. When customer 101 wishes to make a digital change transaction using mobile device 102, customer 101 opens mobile app 103 residing on mobile device 102 and, in operation 280, selects an option indicating that customer 101 would like to commence a digital change transaction. Mobile app 103 determines if mobile device 102 is connected to Internet 107 in operation 281. If mobile device 103 is not connected to Internet 107, then, if not already in such form, in operation 286, mobile app 103 converts passive identifier to a numerical code, to an optical machine readable representation, such as a bar code or QR code, and/or to a communication frequency representation, such as RFID. Then, in operation 287, the identifier is displayed for scanning by point of sale 104 or transmitted to point of sale 104. If, in operation 281, mobile device 102 is connected to Internet 107, then mobile app 103 retrieves the app session token, in operation 288. Then, mobile app 103 sends the app session token and a request for a transaction token to control module 108 in operation 282. Once the transaction token is created by control module 108 and associated with the customer's account, control module 108 transmits it back to mobile app 103, which receives it in operation 283. Then, in operation 284, the transaction token is used to create an active identifier in the form an optical machine readable representation, such as a bar code or QR code, and/or a wireless representation, such as RFID, including NFC, or other identifier transmittable by wireless means, such as Bluetooth or Wi-Fi. The active identifier can then, in operation 285, in the case of optical machine readable representations of the active identifier, be scanned at point of sale 104. Alternatively, in operation 285, in the case of wireless active identifiers, mobile device 102 can transmit the active identifier to point of sale 104. Alternatively, if Internet 107 is available, mobile app 103 can create a readable/transmittable identifier that uses both the passive and active identifiers, for example, displaying them as a single bar code or combing them in a single RFID signal.

Figure 8:
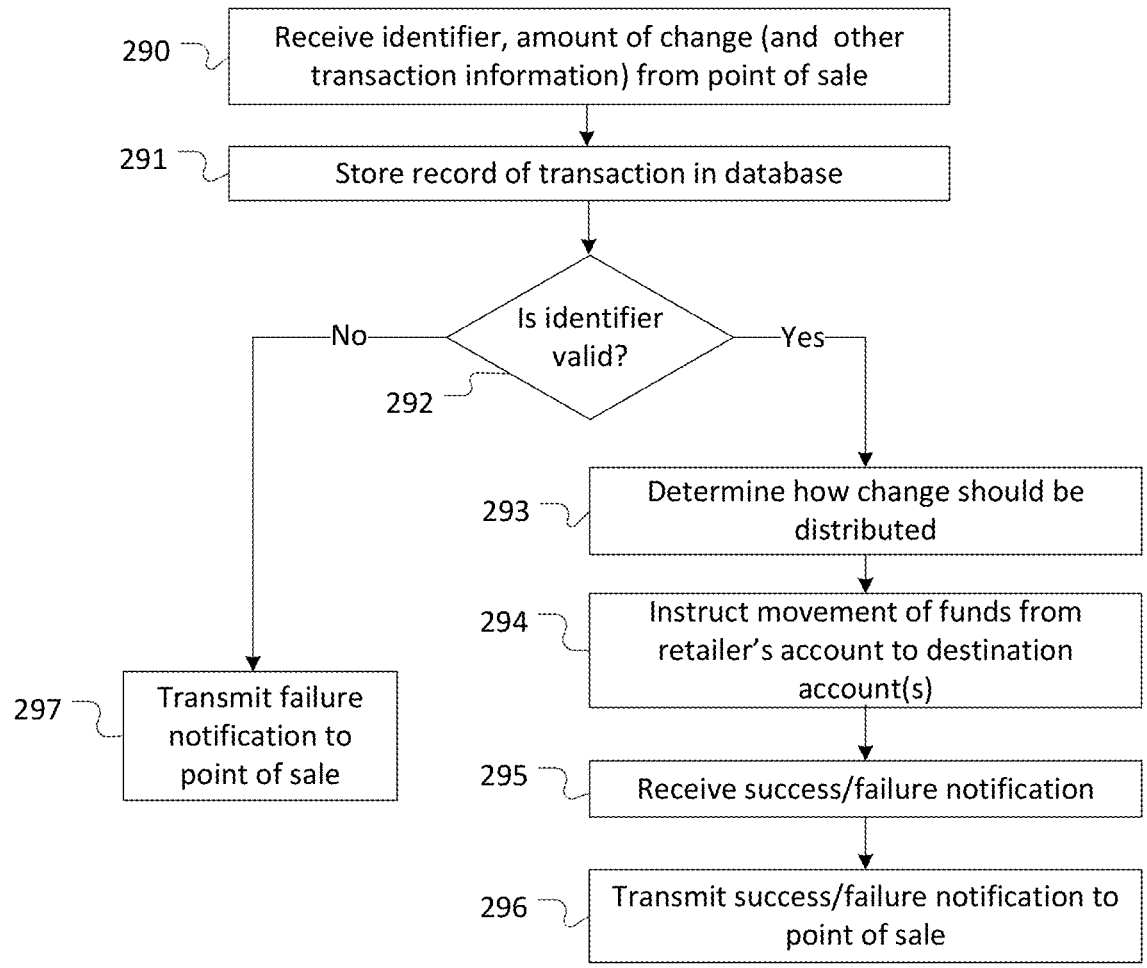
FIG. 8 is a flowchart of a method of processing a digital change transaction performed by a control module according to an embodiment of the present invention.

An embodiment of processing a digital change transaction by control module 108 is shown in FIG. 8 and described with reference to elements in FIG. 1. In operation 290, control module 108 receives an identifier and the amount of change from point of sale 104. Other transaction information may also be received from point of sale 104 including, for example, total amount of purchase, item(s) purchased, number of items purchased, date of purchase, time of purchase, cost of item(s) purchased, type(s) of payments used (e.g. coupons, gift cards, credit cards, cash) and the amount(s) paid using such type(s) of payment(s). Control module 108 stores a record of the transaction in database 132 (FIG. 4A) in operation 291. In operation 292, control module 108 compares the received identifier to identifiers associated with customer accounts. If, in operation 292, the identifier was not matched to a customer account or the identifier was an active identifier that had expired, a failure notification is transmitted to point of sale 104 in operation 297. If the customer account was identified, but the identifier had expired, control module 108, may also send a failure notification to mobile device 102, by, for example, push notification or SMS text message. If, in operation 292, the identifier matches a customer account and, in the case of active identifiers, the identifier has not yet expired, control module 108 will then determine, based on the customer's preferences entered at setup (or entered at some time thereafter), how the change will be distributed, in operation 293. Options for distribution to recipient accounts are further explained below with reference to FIGS. 11A through 11L. Control module 108 will then instruct bank 109 to move funds from retailer's account to one or more destination accounts in operation 294. Control module 108 may receive a success or failure notification from bank 109 in operation 295, which it will then transmit to point of sale 104 in operation 296. Control module 108 may also send a success or failure notification may also send a failure notification to mobile device 102, by, for example, push notification or SMS text message.

Figure 9:
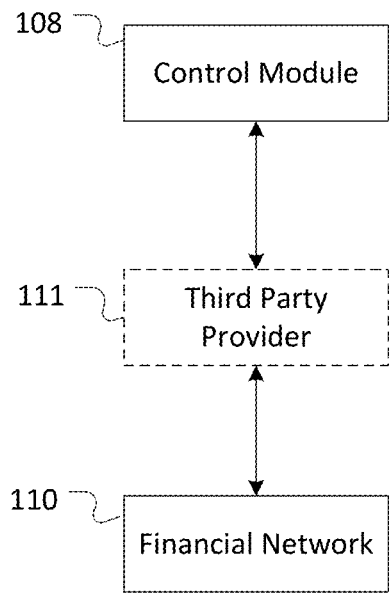
FIG. 9 is a block diagram showing a control module's communication with a financial network and the option for an intermediate third-party provider according to an embodiment of the present invention.
Figure 10:
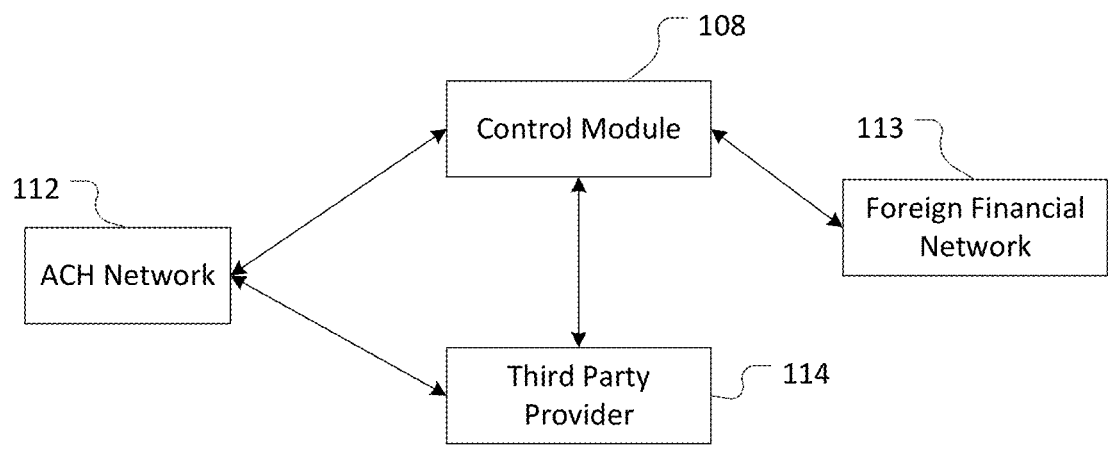
FIG. 10 is a block diagram showing a control module's communication with multiple financial transaction networks and a third party provider according to an embodiment of the present invention.

In order for control module 108 to instruct bank 109 regarding movement of funds, as illustrated in FIG. 9, control module 108 may be in communication with the electronic network for financial transactions of the country in which the system is operating, which is ACH in the United States, represented here by financial network 110. Optionally, control module 108 may be in communication with third-party provider 111, which facilitates access to financial network 110. Communication with third-party provider 111 may be through use of an API. Alternatively, multiple third-party services may be used and/or multiple direct access methods may be used, which may provide use of multiple currencies and reduce transaction delays. For example, as shown in FIG. 10, control module 108 may be in communication with ACH Network 112, third-party provider 114, and foreign financial network 113. Control module 108 may also be in communication with ACH Network 112 via third-party provider 114.

Figure 11A:
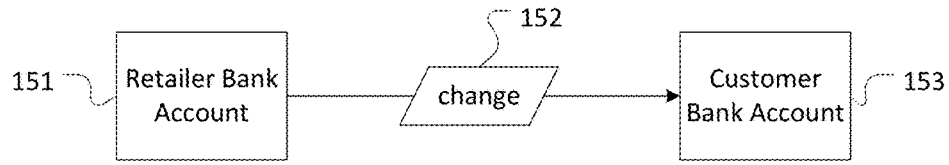
FIG. 11A is block diagram of an exemplary digital change transaction transferring change from a retailer's bank account to a customer's bank account according to an embodiment of the present invention.
Figure 11B:
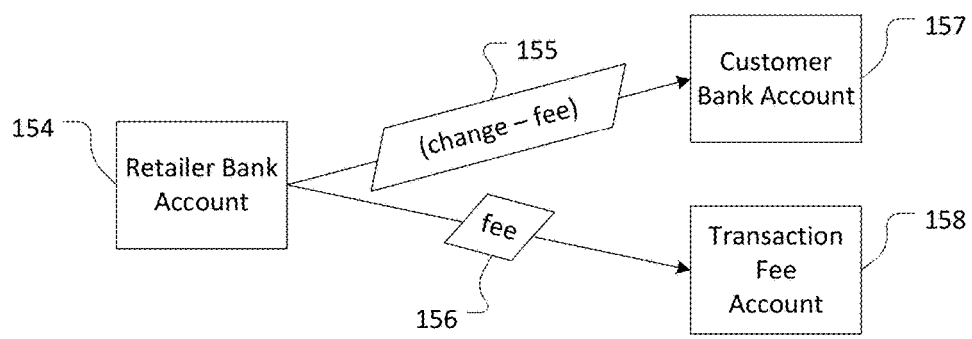
FIG. 11B is a block diagram of an exemplary digital change transaction transferring a portion of a customer's change from a retailer's bank account to a customer's bank account and a portion of the customer's change (a transaction fee) to a transaction fee account according to an embodiment of the present invention.

As illustrated in the exemplary digital change transaction shown in FIG. 11A, each time a digital change transaction occurs, digital change 152 is transferred from retailer bank account 151 to customer bank account 153.

A transaction fee may also be taken from the amount of the change from customer 101's transaction, in which case bank 109 would be directed to transfer the transaction fee to a transaction fee account held by the provider of the digital change service and the remainder of the change amount would be transferred to customer 101's designated recipient account. As illustrated in the exemplary transaction shown in FIG. 11B, transaction fee 156 is automatically transmitted from retailer bank account 154 to transaction fee account 158, which may be held by the provider of the digital change service. The remainder (the amount of the digital change minus the fee) 155 is automatically transferred from retailer bank account 154 to customer bank account 157.

Figure 11C:
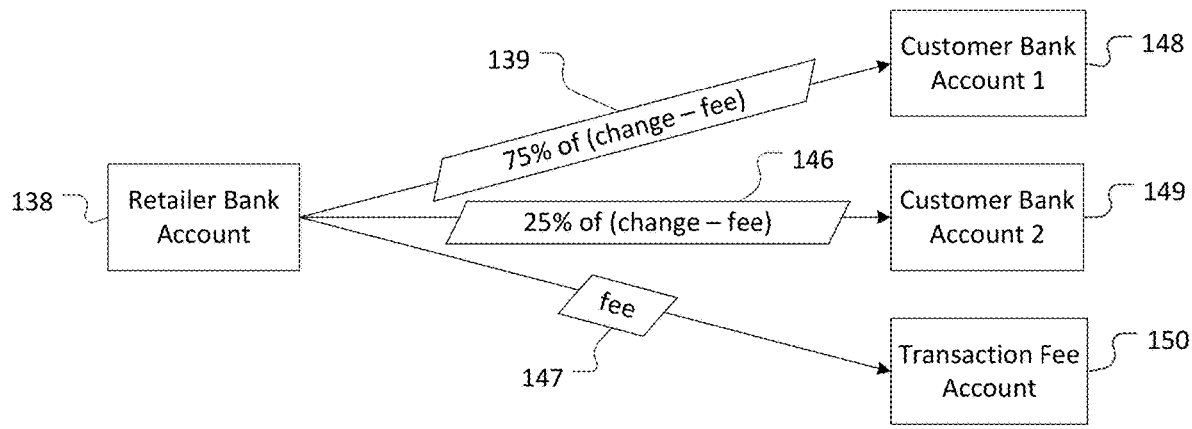
FIG. 11C is a block diagram of an exemplary digital change transaction transferring a portion of a customer's change from a retailer's bank account to a first bank account belonging to the customer, a portion of the customer's change from the retailer's bank account to a second bank account belonging to the customer and a portion of the customer's change (a transaction fee) to a transaction fee account according to an embodiment of the present invention.

The customer may also designate more than one customer bank accounts and assign each a portion of the digital change, as illustrated in the exemplary transaction shown in FIG. 11C in which the customer has designated that 75% of his/her digital change should go to first customer bank account 148 and 25% should go to second customer bank account 149. During the digital change transaction, fee 147 (if present) is transferred to transaction fee account 150 from retailer bank account 138. Seventy-five percent of the remainder of the digital change after the fee is taken 139 is transferred from retailer bank account 138 to first customer bank account 148. Twenty-five percent of the change remaining after fee 147 is taken 146 is transferred from retailer bank account 138 to second customer bank account 149.

Figure 11D:
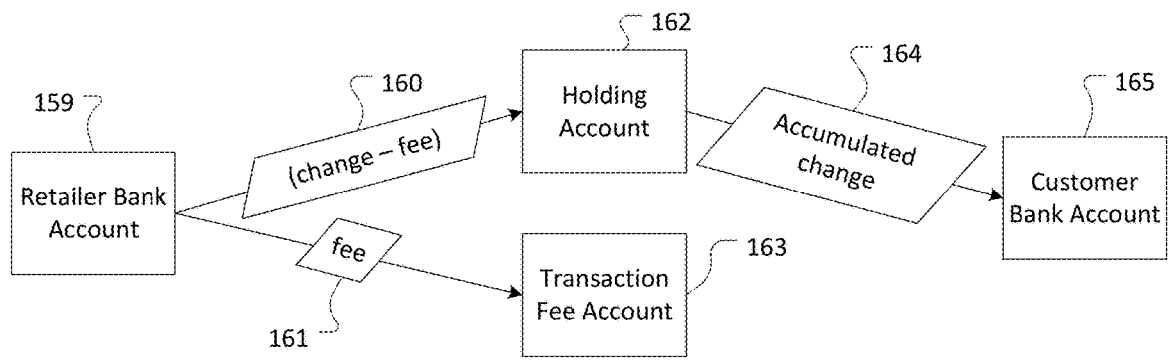
FIG. 11D is a block diagram of an exemplary digital change transaction transferring a portion of a customer's change from a retailer's bank account to a holding account and then on to the customer's bank account and a portion of the customer's change (a transaction fee) to a transaction fee account according to an embodiment of the present invention.

Embodiments also provide for a holding account, which holds funds belonging to a customer in a bank account which may be owned by provider of the digital change service. This holding account may be used by a customer to accumulate and/or hold digital change until one or more recipient bank accounts are designated or until the digital change is used to make a purchase. Holding accounts also allow for limited digital change transactions, which are digital change transactions completed by a customer without that customer having an account setup with the digital change service provider. Holding accounts allow the digital change to be held for the unregistered customer by the digital change service provider until the customer registers and designates an account. Association and tracking of such unregistered transactions are explained in further detail herein below. The use of holding account also allows a customer to approve a transfer before digital change is transferred to a designated recipient account. An exemplary transaction using holding account 162 is shown in FIG. 11D. During the digital change transaction, transaction fee 161 is transferred to transaction fee account 163 from retailer bank account 159. Remainder of change 160 is transferred from retailer bank account 159 to holding account 162. Multiple digital change transactions may occur and the digital change will accumulate in holding account 162. Once the customer designates a bank account, accumulated change 164 will be transferred to customer bank account 165. Alternatively, the customer may retain a portion of his/her available digital change in holding account 162 and only transfer a portion to customer bank account 165. This example presumes transaction fee 161 is taken from the digital change; however, such a fee may also not be taken from the digital change, in which case the entire amount of the digital change will be transferred to holding account 160.

Figure 11E:
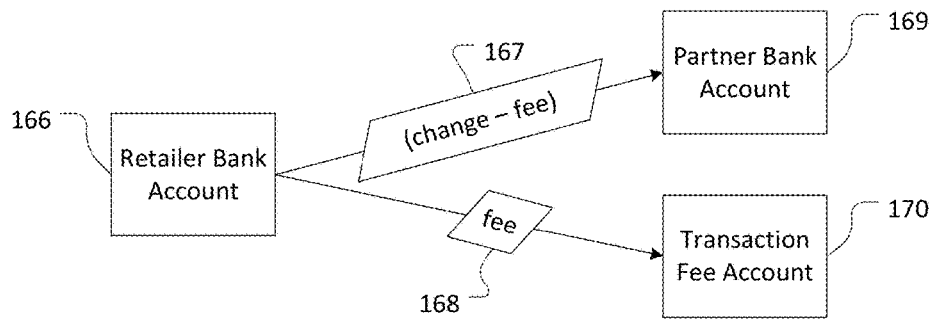
FIG. 11E is a block diagram of an exemplary digital change transaction transferring a portion of a customer's change from a retailer's bank account to a partner's bank account and a portion of the customer's change (a transaction fee) to a transaction fee account according to an embodiment of the present invention.

The customer may also designate a partner organization, such as charitable organization, to donate all or a portion of customer's digital change, as shown in the exemplary transaction illustrated in FIG. 11E. Here, fee 168 is transferred to transaction fee account 170 from retailer bank account 166. Remainder of change 167 is transferred from retailer bank account 166 to partner bank account 169. Because the control module stores a record of all transaction, all transfers to charitable partner organizations can be tracked and a receipt reflecting such transactions can be generated.

Figure 11F:
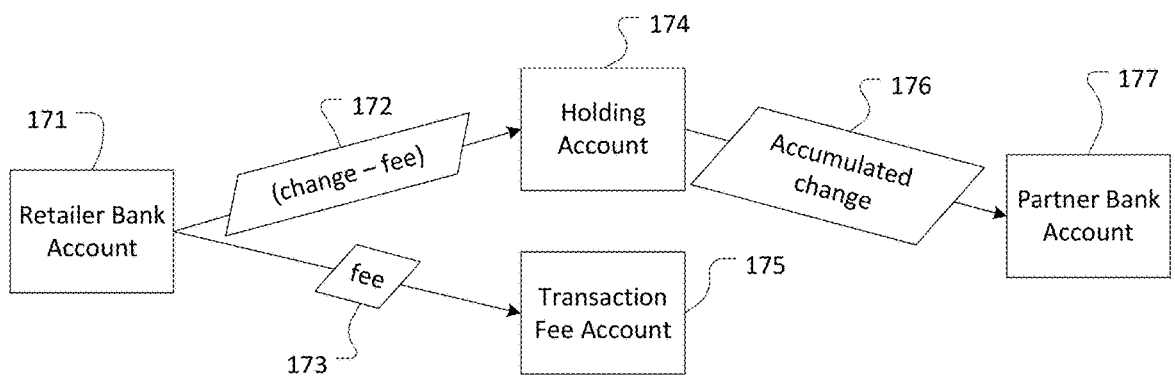
FIG. 11F is a block diagram of an exemplary digital change transaction transferring a portion of a customer's change from a retailer's bank account to a holding account and then on to a partner's bank account and a portion of the customer's change (a transaction fee) to a transaction fee account according to an embodiment of the present invention.
Figure 11G:
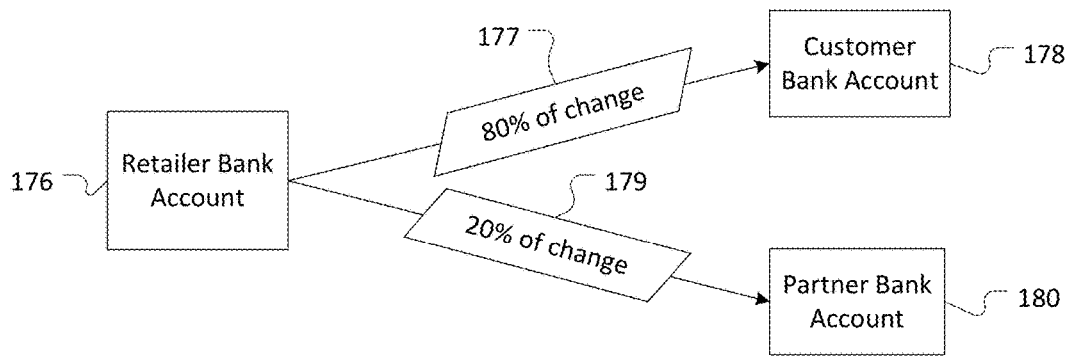
FIG. 11G is a block diagram of an exemplary digital change transaction transferring a portion of a customer's change from a retailer's bank account to the customer's bank account and a portion of the customer's change to a partner's bank account according to an embodiment of the present invention.
Figure 11H:
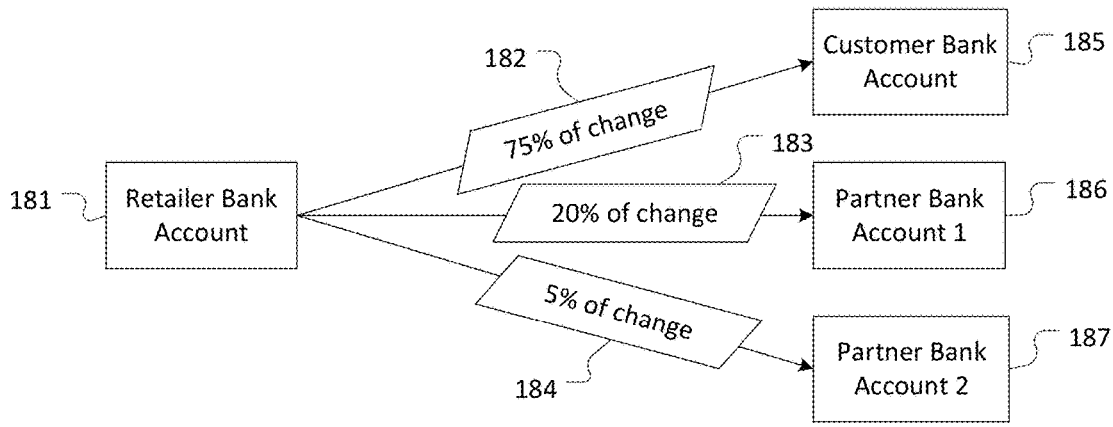
FIG. 11H is a block diagram of an exemplary digital change transaction transferring a portion of a customer's change from a retailer's bank account to the customer's bank account, a portion of the customer's change to a first partner's bank account and a portion of the customer's change to a second partner's bank account according to an embodiment of the present invention.

In embodiments, digital change may also be accumulated in holding account and then transferred to a partner organization, as shown in the exemplary transaction illustrated in FIG. 11F. Here, transaction fee 173 is transferred to transaction fee account 175 from retailer bank account 171. Remainder of change 172 is transferred from retailer bank account 171 to holding account 174. Multiple digital change transactions may occur and the digital change will accumulate in holding account 174. Once the customer designates a partner organization, accumulated change 176 will be transferred to partner bank account 177. Alternatively, the customer may designate only a percentage of his/her digital change to go to partner bank account 177. The customer may retain the remaining portion of his/her available digital change in holding account 174. The customer may also set maximum dollar amounts that limit the amount that is transferred to partner bank account 177. Once the limit is reached, the remaining digital change would accumulate in holding account 174. This example presumes transaction fee 173 is taken from the digital change; however, such a fee may also not be taken from the digital change, in which case the entire amount of the digital change will be transferred to holding account 174.

The customer may also designate one or more of his own accounts to receive digital change and also designate one or more charitable accounts. In an exemplary transaction shown in FIG. 11G, in which the customer designated 80% of his/her digital change to go to his/her bank account and the remaining 20% to go to a partner organization, 80% of the digital change 177 is transferred from retailer bank account 176 to customer bank account 178 and 20% of the digital change 179 is transferred from retailer bank account 176 to partner bank account 180. A transaction fee may also be taken from the digital change and transferred to a transaction fee account in which case the percentages would be applied after the digital change was reduced by the amount of the transaction fee. In another exemplary transaction shown in FIG. 11H, the customer designated 75% of his/her digital change to go to his/her bank account, 20% to go to a first partner organization and 5% to go to a second partner organization. Here, 75% of the digital change 182 is transferred from retailer bank account 181 to customer bank account 185, 20% of the digital change 183 is transferred from retailer bank account 181 to first partner bank account 186 and 5% of the digital change 184 is transferred from retailer bank account 181 to second partner bank account 187. A transaction fee may also be taken from the digital change and transferred to a transaction fee account in which case the percentages would be applied after the digital change was reduced by the amount of the transaction fee.

Figure 11I:
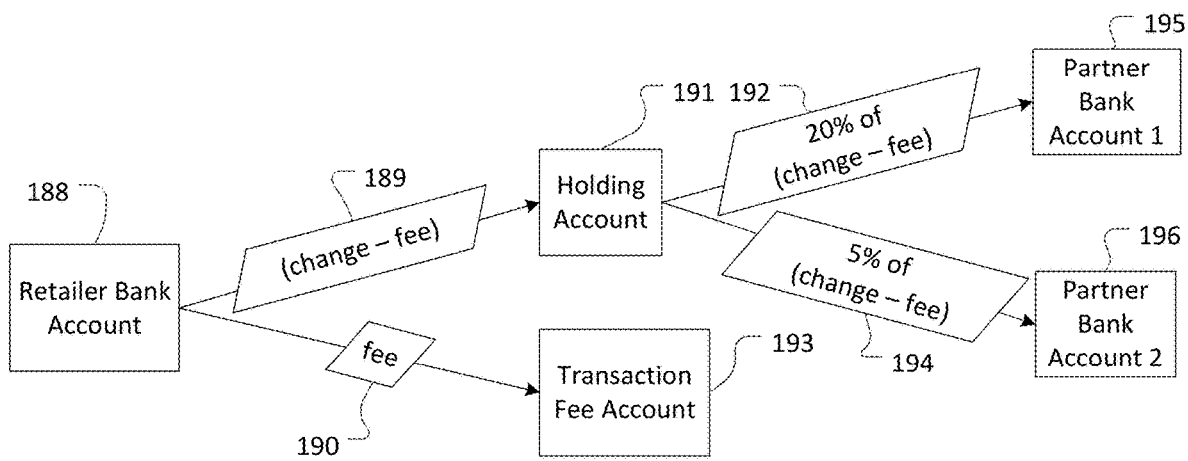
FIG. 11I is a block diagram of an exemplary digital change transaction transferring a portion of a customer's change (a transaction fee) from a retailer's bank account to a transaction fee account and a portion of the customer's change from the retailer's bank account to a holding account and then transferring a portion of that amount from the holding account to a first partner's bank account and the remaining portion from the holding account to a second partner's bank account according to an embodiment of the present invention.

In embodiments, digital change may also be accumulated in holding account and then transferred to multiple partner organizations, as shown in the exemplary transaction illustrated in FIG. 11I. Here, transaction fee 190 is transferred to transaction fee account 193 from retailer bank account 188. Remainder of change 189 is transferred from retailer bank account 188 to holding account 191. Multiple digital change transactions may occur and the digital change will accumulate in holding account 191. Once the customer designates partner organizations and assigns each a percentage, percentage of the accumulated change 192 will be transferred to first partner bank account 195 and percentage of accumulated change 194 will be transferred to second partner bank account 196. Here the first partner organization received 20% and the second partner organization received 5%, meaning that the customer retained 75% of the accumulated change in holding account 191. This example presumes transaction fee 190 is taken from the digital change; however, such a fee may also not be taken from the digital change, in which case the entire amount of the digital change will be transferred to holding account 191.

Figure 11J:
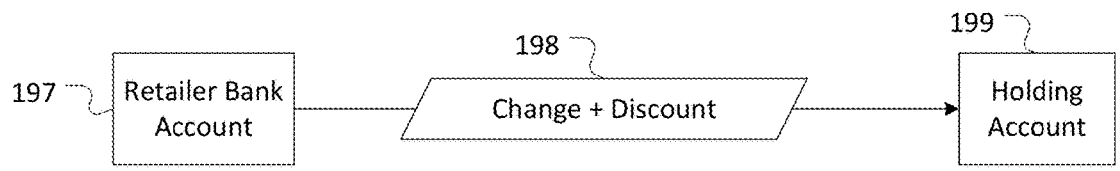
FIG. 11J is a block diagram of an exemplary digital change transaction transferring change plus a discount (or coupon) amount from a retailer's bank account to a holding account according to an embodiment of the present invention.
Figure 11K:
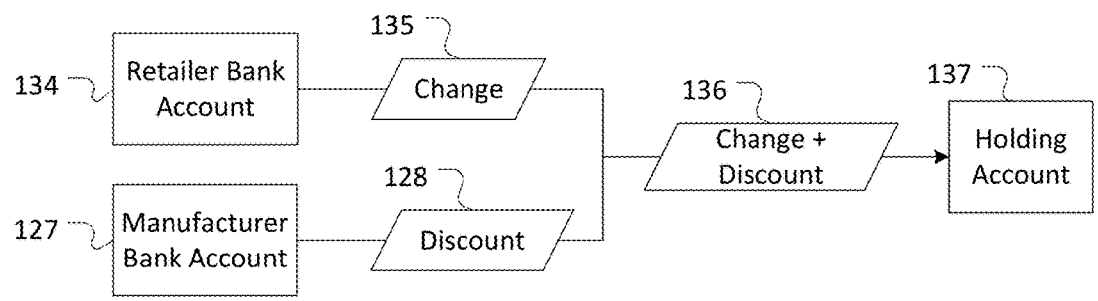
FIG. 11K is a block diagram of an exemplary digital change transaction transferring change from a retailer's bank account and a discount (or coupon) amount from a manufacturer's bank account and depositing both the change and the discount amount in a holding account according to an embodiment of the present invention.
Figure 11L:
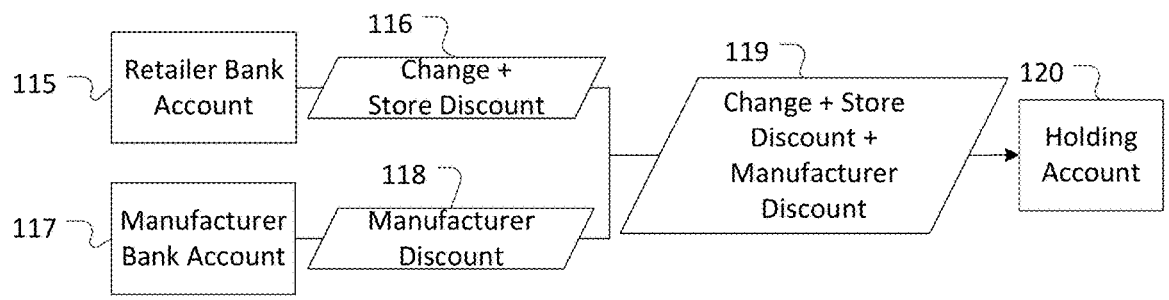
FIG. 11L is a block diagram of an exemplary digital change transaction transferring change plus a discount (or coupon) amount from a retailer's bank account and a discount (or coupon) amount from a manufacturer's bank account and depositing both the change and discount amount from the retailer and the discount from the manufacturer in a holding account according to an embodiment of the present invention.

In embodiments, customer receives coupons or other discounts as part of digital change transactions, as shown in exemplary transaction illustrated in FIGS. 11J-11L. Here, coupons can be selected by a customer prior to making a purchase. Alternatively, the items purchased can be transmitted by the point of sale along with other transaction information and this information can be compared against a database of available discounts. This comparison would take place, for example, during operation 293 of FIG. 8 when the control module is determining how change should be distributed. The discounts may be store discounts or manufacturer's discounts. If the discount is a store discount, as shown in FIG. 11J, the amount of the digital change plus the amount of the discount 198 is transferred from retailer bank account 197 to holding account 199. The digital change and the discount amount may also be transferred from retailer bank account 197 to holding account 199 as separate transactions. If the discount is a manufacturer's discount, as shown in FIG. 11K, amount of the digital change 135 is transferred from retailer bank account 134 and amount of the discount 128 is transferred from manufacturer bank account 127. Total of the digital change plus the discount 136 is then deposited in holding account 137. Change 135 and discount 128 may also be deposited in holding account 137 in separate transactions. If there is both a store discount and a manufacturer's discount, as shown in FIG. 11L, amount of the digital change plus the amount of the store discount 116 is transferred from retailer bank account 115. The amount of manufacturer discount 118 is transferred from manufacturer bank account 117. Total of the digital change, the store discount and the manufacturer discount 119 is then deposited in holding account 120. The digital change, store discount, and/or manufacturer discount 118 may also be deposited in holding account 120 in separate transactions. A transaction fee may also be taken during the transactions shown in FIGS. 11J-11L and transferred to a transaction fee account. If the transaction fee is a percentage, then the transaction fee could be calculated using only the digital change or using the total of the digital change and the discount amount. The exemplary transaction shown in FIGS. 11J-11L also presume use of a holding account; however, the total of the digital change and the discount amount may also be distributed directly to one or more customer bank accounts and/or partner bank accounts.

Returning to FIG. 1, after a digital change transaction has taken place, mobile app 103 may refresh the account and balance information for customer 101. This may be done passively by mobile app 103's receipt of a push notification from control module 108, by subscription to a publisher/subscriber network, or by mobile app 103 actively polling control module 108. Mobile app also allows customer 101 to instruct withdrawal of funds from his/her holding account to a designated bank account or to a partner organization's bank account.

In embodiments, mobile app 103 can also be used by customer 101 to locate participating retailers. Mobile app 103 acquires mobile device 102's latitude and longitude coordinates using, for example, GPS 123 (FIG. 2) and transmits, via Internet 107, the coordinates to control module 108. Control module 108, will compare the coordinates to a list or database of participating retailers and return a list of nearby retailers to mobile app 103. Mobile app 103 may display the list of nearby retailers as a list or on a map.

Figures 12A, 12B:
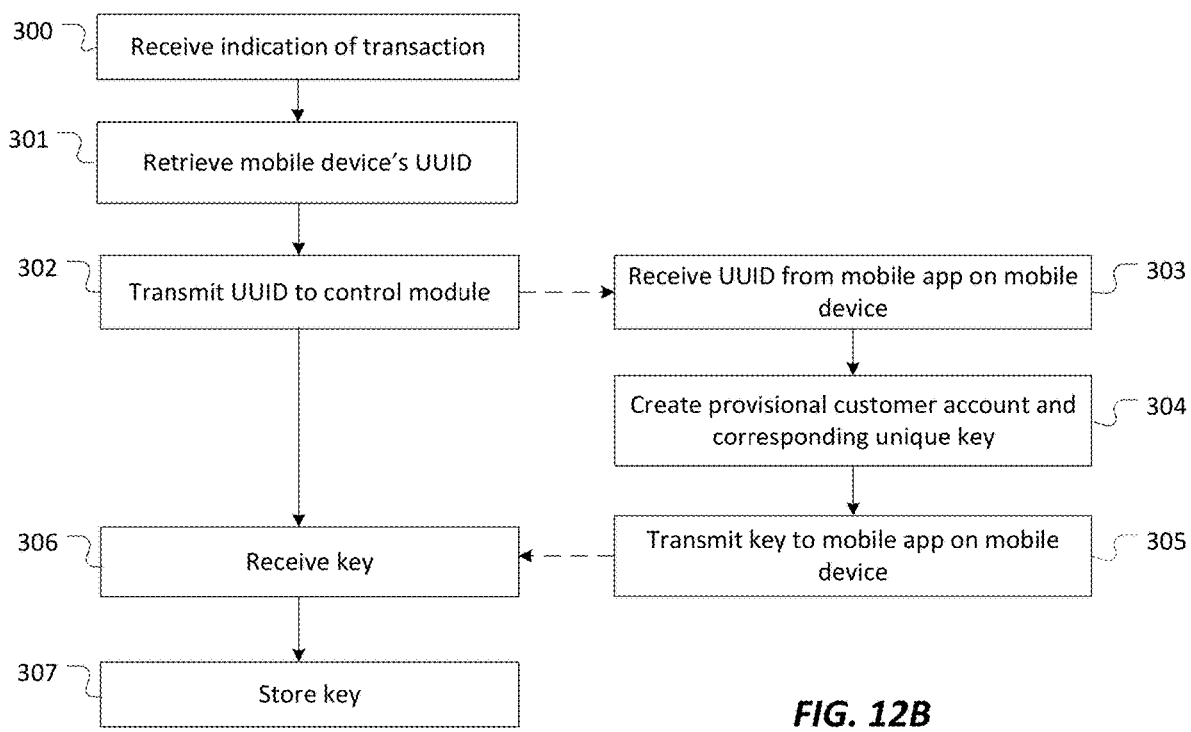
FIG. 12A is a flowchart of a method of obtaining a key for a limited digital change transaction (a transaction without an account) performed by a mobile app according to an embodiment of the present invention.
FIG. 12B is a flowchart of a method of creating a provisional customer account and corresponding key for a limited digital change transaction performed by a control module according to an embodiment of the present invention.

In embodiments, limited digital change transactions can be completed, which are digital change transactions by a customer that does not have an account setup with the digital change service provider. An embodiment of a method of obtaining an identifier for a limited digital change transaction is shown in FIG. 12A from the perspective of a mobile app and FIG. 12B from the perspective of a control module. When the customer wishes to make his/her first limited digital change transaction using the mobile device, the customer opens the mobile app residing on his/her mobile device and, in operation 300, selects an option indicating that he/she would like to commence a digital change transaction. The mobile app retrieves the mobile device's UUID in operation 301 and transmits it to the control module in operation 302. After receiving the UUID from the mobile app, in operation 303, the control module creates a provisional customer account, a unique key corresponding to the account and a passive identifier corresponding to the account in operation 304. The control module then transmits the key and the passive identifier to the mobile app on mobile device in operation 305. In operation 306, the mobile app receives the key and passive identifier and, in operation 307, stores the key and passive identifier. Either passive or active identification can then be used to perform the first and all following limited digital change transactions with funds being transferred into the provisional customer account. A provisional customer account is a holding account (as described above) for an unregistered user.

Just as in passive identification for customers with customer accounts, during a limited digital change transaction, the passive identifier is converted, if necessary to a transmittable or readable format and then transmitted, scanned or otherwise entered into the point of sale. The passive identifier is transmitted by point of sale to the control module and used to identify the customer's provisional account in accordance with the method shown in and discussed with reference to FIG. 8. In active identification, the key and UUID are sent by the mobile app to the control module in place of the app session token. The control module uses the key and UUID to determine if there is a match to an existing provisional account and creates a transaction token in accordance with the method shown in and discussed with reference to FIG. 6B. The customer will have to create an account in order to withdraw funds in a holding account or transfer them to a partner organization.

Embodiments of the invention provide a method for collection and aggregation of shopping and spending related customer data. Exemplary data that may be collected includes the date and time of arrival at a retailer, the date and time of departure from a retailer, the date and time of checkout at a retailer, the time spent at a retailer, the items purchased, the cost of each item purchased, the total cost of a purchase and the payment method used. This data may be used to aggregate and analyze long-term, cross-retailer shopping and spending habits.

Figure 13:
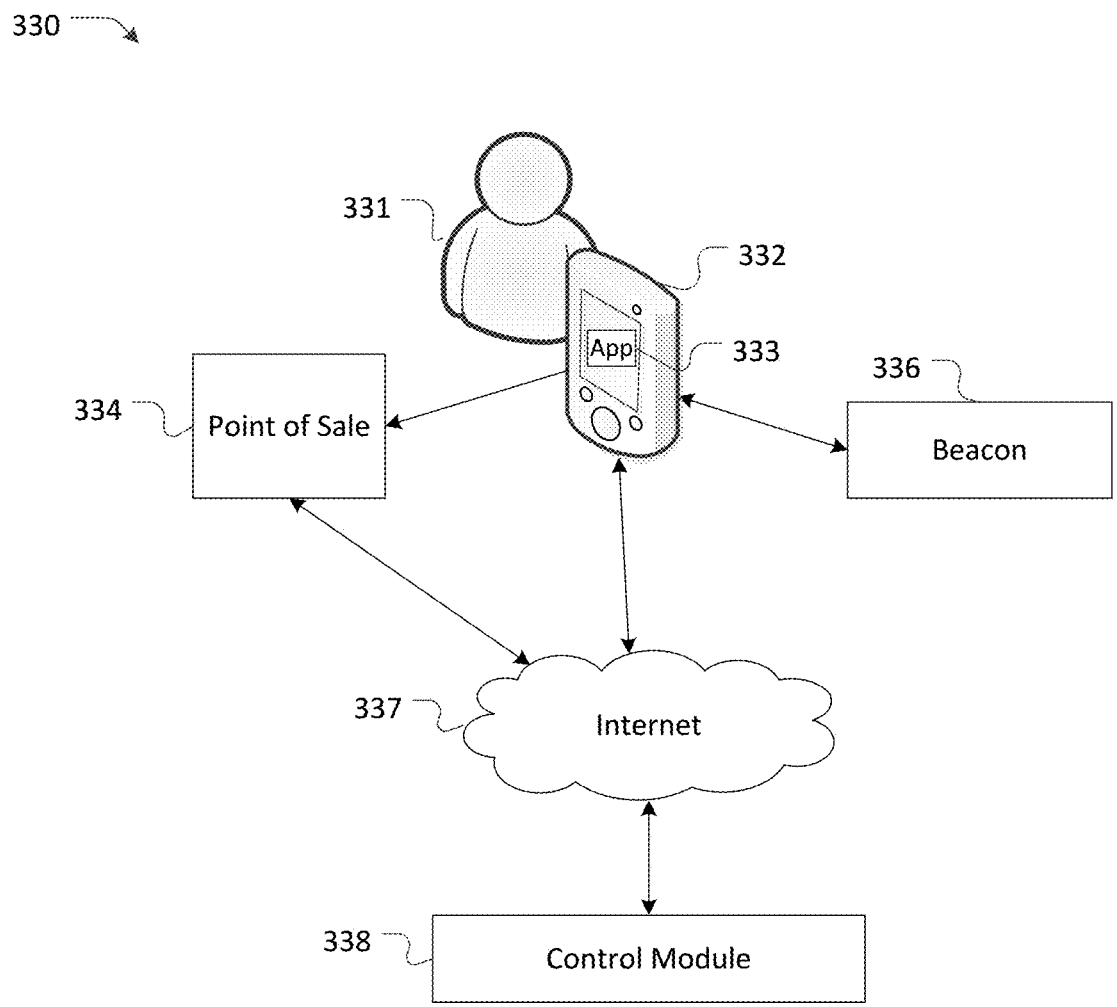
FIG. 13 is a block diagram of a system for collection and aggregation of shopping and spending related customer data according to an embodiment of the present invention.

An exemplary embodiment of a system for collection and aggregation of shopping and spending related customer data is shown in FIG. 13. System 330 comprises control module 338, point of sale 334, mobile app 333 and beacon 336. Control module 338 is in two-way communication with point of sale 334, via Internet 337. Point of sale 334 and beacon 336 are located at a retailer. Beacon 336 may be located at the entrance/exit of the retailer. Although one beacon is shown in FIG. 13, multiple beacons may be used. At least one beacon may be placed at each entrance/exit. Control module 338 may be located remotely from the retailer and may be in communication with other point of sale devices at the retailer or with point of sale devices at other retailers. Control module 338 is also in two-way communication with mobile app 333 residing on mobile device 332, via Internet 337. Although not shown here, control module 338 may also be in communication with numerous other mobile apps. Mobile device 332 and mobile app 333 are associated with consumer 331. Mobile device 332 may be in communication with point of sale 334. Mobile device 332 may also be in communication with beacon 336. Beacon 336 comprises a wireless transmitter which may be a Bluetooth transmitter or a Bluetooth low energy transmitter. Beacon 336 transmits a wireless signal, which may, for example, be a Bluetooth signal or a Bluetooth low energy signal, that comprises a retailer ID. The retailer ID is unique to the retailer where beacon 336 is located and identifies the retailer. Control module 338 maintains a list or database of retailers and each retailer's corresponding retailer ID. In addition to the functionality described with respect to this embodiment, mobile device 332 may have the same or similar components and functionality as mobile device 102, point of sale 334 may have the same or similar components and functionality as point of sale 104, and control module 338 may have the same or similar components and functionality as control module 108.

Figure 14:
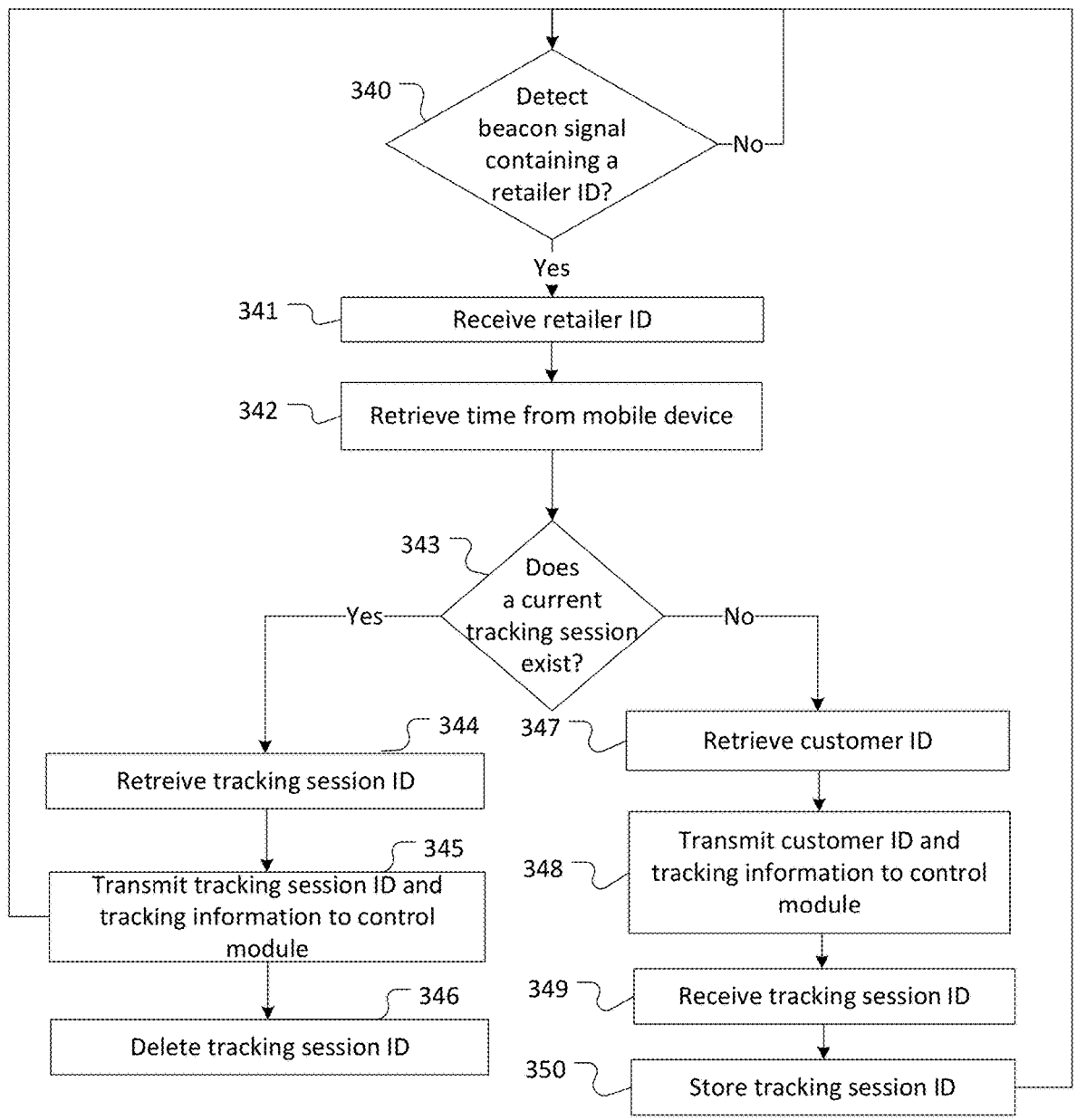
FIG. 14 is a flowchart of a method of collection and aggregation of shopping and spending related customer data as performed by a mobile device according to an embodiment of the present invention.

An exemplary embodiment of a method for collection and aggregation of shopping and spending related customer data as executed by mobile device 332 is shown in FIG. 14 and described with reference to elements of FIG. 13. Mobile app 333 or a process running in the background on mobile device 332 poles for the beacon signal, in operation 340. When customer 331 enters or exits a retailer, mobile app 333 will detect the beacon signal comprising the retailer ID, in operation 340. Mobile app 333 receives the retailer ID in operation 341 and retrieves the time from mobile device 332 in operation 342. The time retrieved may comprise the date and time or just the time of day. Mobile app 333 then determines if a current tracking session exists in operation 343. A tracking session begins when a customer enters a retailer and ends when the customer exits the retailer. If a current tracking session does not exist in operation 343, then mobile app 333 retrieves the customer ID. The customer ID may comprise an app session token, a UUID or a UUID and key, depending on whether customer 331 is a registered user, an unregistered user without a key assigned or an unregistered user with a key assigned, respectively. Mobile app 333 transmits customer ID and tracking information to control module 338 in operation 348. Tracking information comprises the customer ID, the retailer ID and the time. Mobile app 333 will then receive a tracking session ID from control module 338 in operation 349, which it will store in operation 350. If a current tracking session does exist in operation 343, then mobile app 333 retrieves the tracking session ID in operation 344. Mobile app 333 transmits the tracking session ID and tracking information to control module 338 in operation 345. The tracking session has now completed, so mobile app 333 deletes tracking session ID in operation 346.

Figure 15:
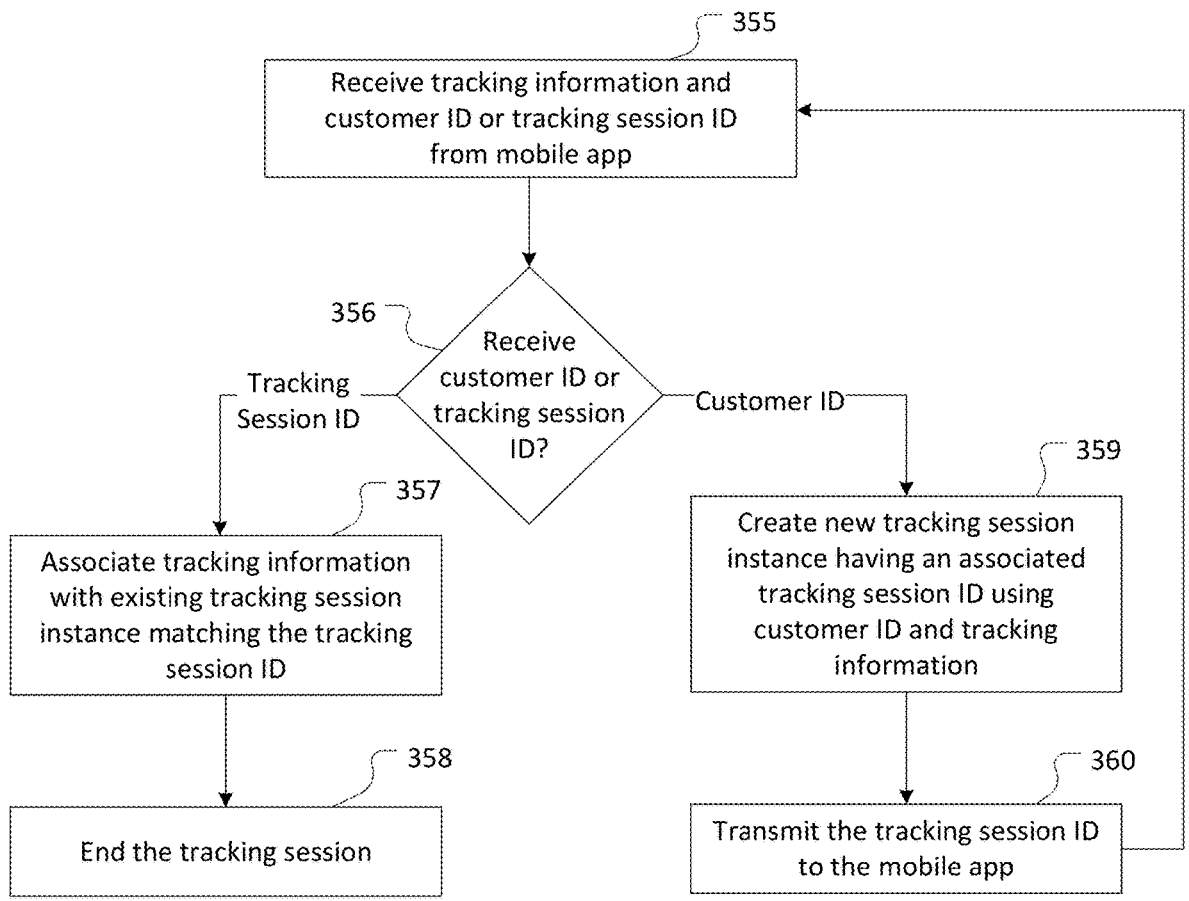
FIG. 15 is a flowchart of a method of collection and aggregation of shopping and spending related customer data as performed by a control module according to an embodiment of the present invention.

An exemplary embodiment of a method for collection and aggregation of shopping and spending related customer as executed by control module 338 is shown in FIG. 15, and described with reference to elements of FIG. 13. Control module 338 receives tracking information and a customer ID or a tracking session ID from mobile app 333 in operation 355. Control module 338 will receive a customer ID if the customer is entering the retailer or it will receive a tracking session ID if the customer is exiting the store (since the tracking session ID was created when the customer entered the retailer). In operation 356, control module 338 determines if it has received a customer ID or a tracking session ID. If control model 338 has received a customer ID, then, in operation 359, control module 338 create a new tracking session instance. The new tracking session instance will store the customer ID and tracking information and will have a tracking session ID associated with it. Control module 338 will then transmit the tracking session ID to mobile app 333 in operation 360. If control module 338 has received a tracking session ID in operation 356, then, in operation 357, control module 338 associates the received tracking information with the existing tracking session instance by matching the tracking session ID. Then, in operation 358. control module 338 ends the tracking session.

If, during the visit to the retailer, customer 331 makes a purchase and uses mobile app 333 to complete a digital change transaction, control module 338 can add information from the transaction to the tracking session. Control module 338 will receive transaction information and a tracking session ID from point of sale 334. The transaction information may comprise the time of checkout, the items purchased, the cost of each item purchased, the total cost of the purchase, and/or the type of payment method used. Control module 338 will then associate the transaction information with the existing tracking session instance. Tracking session instances can be stored with a reference to a customer's account as described above or can be stored with random anonymous identifier which would allow data to be collected in an anonymous manner. If stored anonymously long-lasting tracking sessions can be established by reusing the random anonymous identifier thereby allowing control module 338 to track multiple purchases of a single customer without storing any identifying information about the customer.

Figures 16A, 16B:
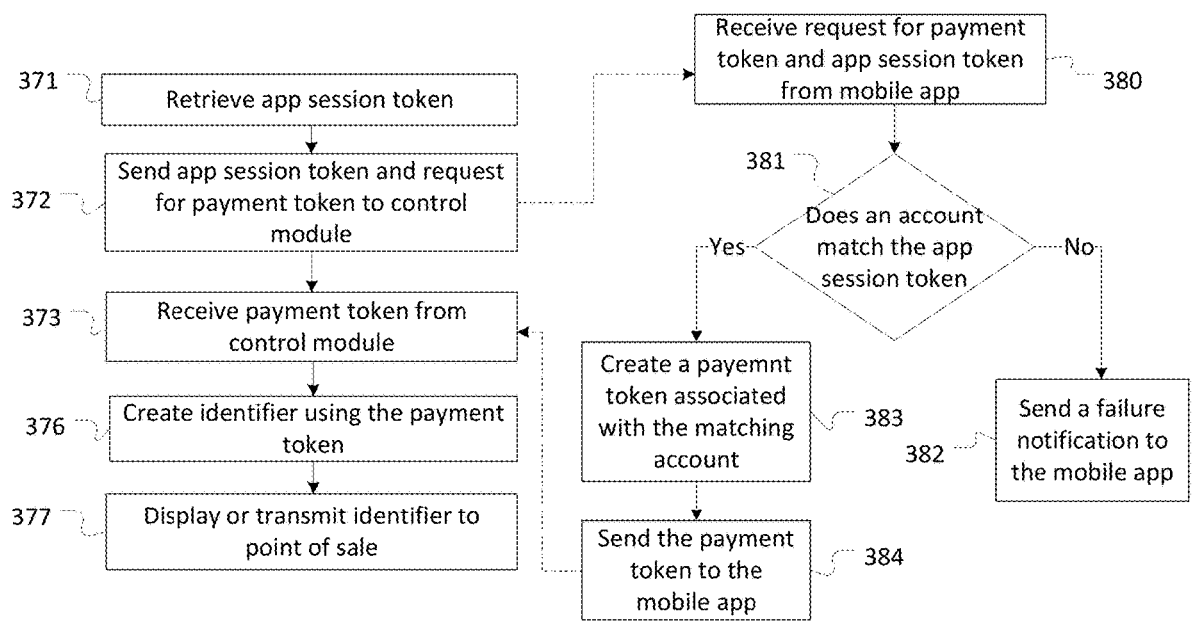
FIG. 16A is a flowchart of a method of obtaining an active identifier for a digital payment transaction performed by a mobile device according to an embodiment of the present invention.
FIG. 16B is a flowchart of a method of creating an active identifier for a digital payment transaction performed by a control module according to an embodiment of the present invention.

In embodiments, a customer can make a payment using funds in his/her holding account. As shown in FIGS. 16A and 16B, active identification for a payment transaction is executed by the mobile app (FIG. 16A) and the control module (FIG. 16B). The mobile app retrieves the app session token in operation 371. The mobile app sends the app session token to the control module along with a request for a payment token in operation 372. The control module receives the request for the payment token and the app session token from the mobile app in operation 380. The control module determines, in operation 381, if an account existing on the control module has an app session token matching the app session token received from the mobile app. If the received app session token does not match any app session token associated with any accounts, then, in operation 382, a failure notification is sent to the mobile app. If the received app session token doesn't match an app session token associated with an account, then, in operation 383 the control module creates a payment token associated with the matching account. The payment token is associated with the customer's account and also identifies the timeframe in which the transaction should occur. The payment token may only be valid for a pre-defined time following creation and this time period may be short (e.g. between 30 and 300 seconds), which may protect against fraudulent transactions. After this time period, the payment token would expire. A transaction using the payment token and occurring outside of this timeframe would be rejected by the control module. In addition, once a payment token is used, it expires. Therefore, repeated attempts to use the same payment token will also fail. In operation 384 the control module sends the payment token to the mobile app. The payment token is then received by the mobile app in operation 373. Then, in operation 376, the payment token is used by the mobile app to create an identifier in the form of an optical machine-readable representation, such as a bar-code or QR code and/or a wireless representation such as RFID, including NFC, or other identifier transmittable by wireless means, such as Bluetooth or Wi-Fi. The active payment identifier can then, in operation 377, in the case of optical machine-readable representations of the identifier, be displayed so it can be scanned by a point of sale. Alternatively, in operation 377, in the case of wireless identifiers, the mobile app may cause the mobile device to transmit the active payment identifier to the point of sale. During a payment transaction, the point of sale sends the payment identifier received from the mobile device along with the payment amount to the control module.

Figure 17:
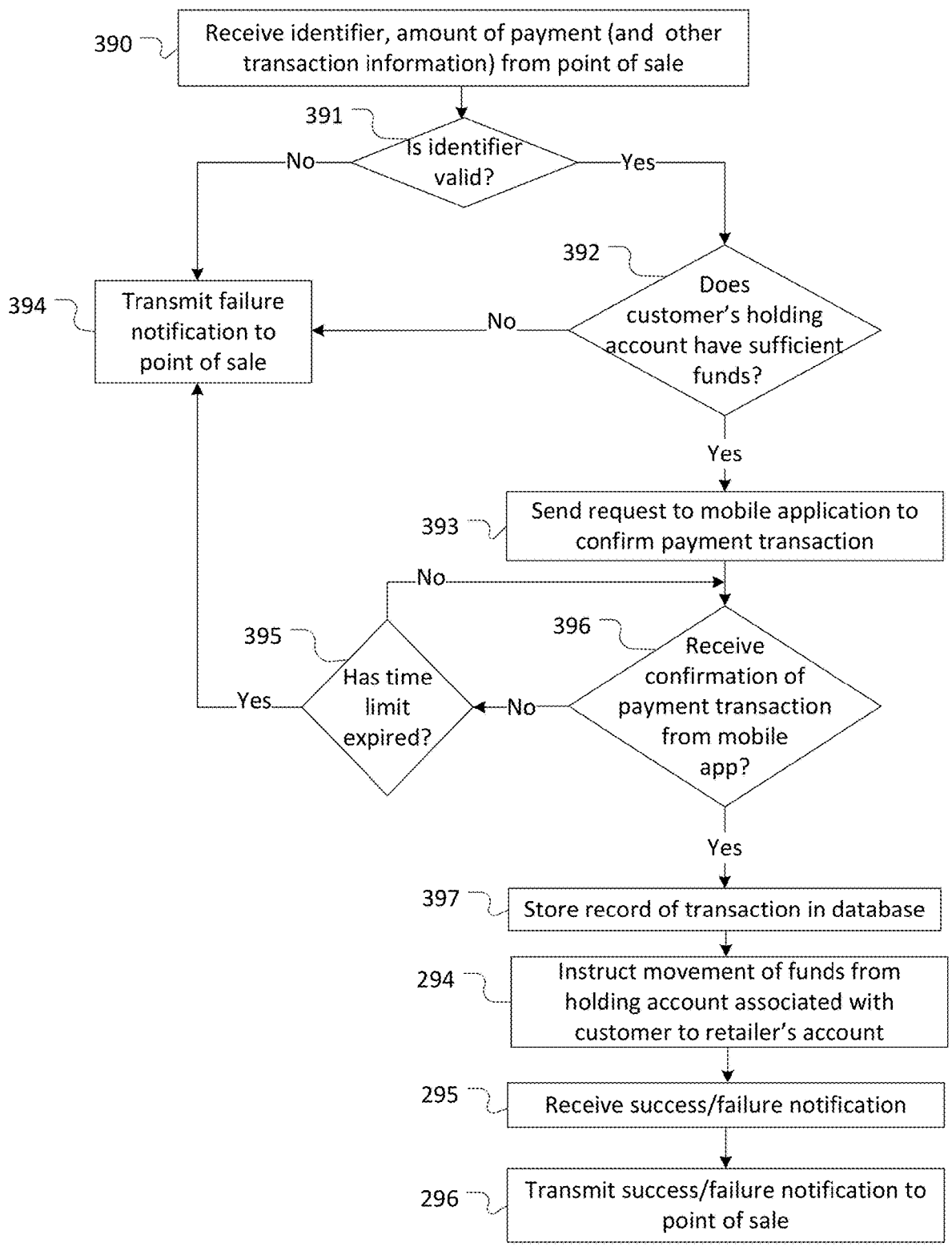
FIG. 17 is a flowchart of a method of performing a digital payment transaction performed by a control module according to an embodiment of the present invention.

An embodiment of processing a digital payment transaction by the control module is shown in FIG. 17. In operation 390, the control module receives a payment identifier and the amount of payment from the point of sale. Other transaction information may also be received from the point of sale. In operation 391, the control module compares the received payment identifier to payment identifiers associated with customer accounts. If, in operation 391, the payment identifier was matched to a customer account or the payment identifier has expired, then a failure notification is transmitted to the point of sale in operation 394. If, in operation 391, the payment identifier matches a customer account and the identifier has not yet expired, the control module will then determine, whether the customer's holding account has sufficient funds in operation 392. If the customer's holding account does not have sufficient funds, then the control module will transmit a failure notification to the point of sale in operation 394. If the customers holding account has sufficient funds in operation 392, then, in operation 393, the control module will send a request to the mobile application to confirm the payment transaction. The control module will wait a predetermined time (e.g. 300 seconds) in operation 396, to receive confirmation of the payment transaction from the mobile app. If, in operation 395, the time limit expires, then a failure notification will be sent to the mobile app in operation 394. If the control module receives confirmation of the payment transaction from the mobile app within the time limit then, in operation 397, the control module will store a record of the payment transaction in its database. Next, in operation 398, the control module will instruct the bank or other financial institution to move funds from the holding account associated with customer to the retailer's account. The control module may receive a success or failure notification from the bank in operation 399, which it will then transmit the point of sale in operation 389. The point of sale may then display the success or failure notification on its display. In addition, the control module may integrate with payment services such as Apple Pay or Google Wallet to allow funds available in the holding account associated with customer to be used as payment sources in Apple Pay or Google Wallet transactions.

In embodiments, rewards can be collected by a customer. Rewards are offered at reward locations that may be displayed on a map on a customer's mobile device. Retailers may also be rewards locations. The customer can visit a reward location and, using the mobile app, collect the reward available at that reward location. Exemplary rewards include, for example, discounts, coupons, digital currency, entries to raffles and digital tokens (which may be collected and redeemed for real value rewards). If a retailer is a reward location, it may allow the customer to receive additional rewards for entering the retailer and/or for making a purchase at the retailer, which would be tracked by methods as described herein. Reward locations may be located any-where. Restrictions may be placed on how often or under what circumstances the reward can be collected.

In an exemplary embodiment, the control module comprises a database of reward locations and their associated restrictions and rewards. The database may have associated there with geobox query algorithms for efficient querying of locations inside a defined geobox. The geobox may be defined by a set of South-West latitude/longitude and North-East latitude/longitude pairs. The control module may also comprise a controller that will enforce restrictions and fetch eligible reward locations.

Figures 18A, 18B:
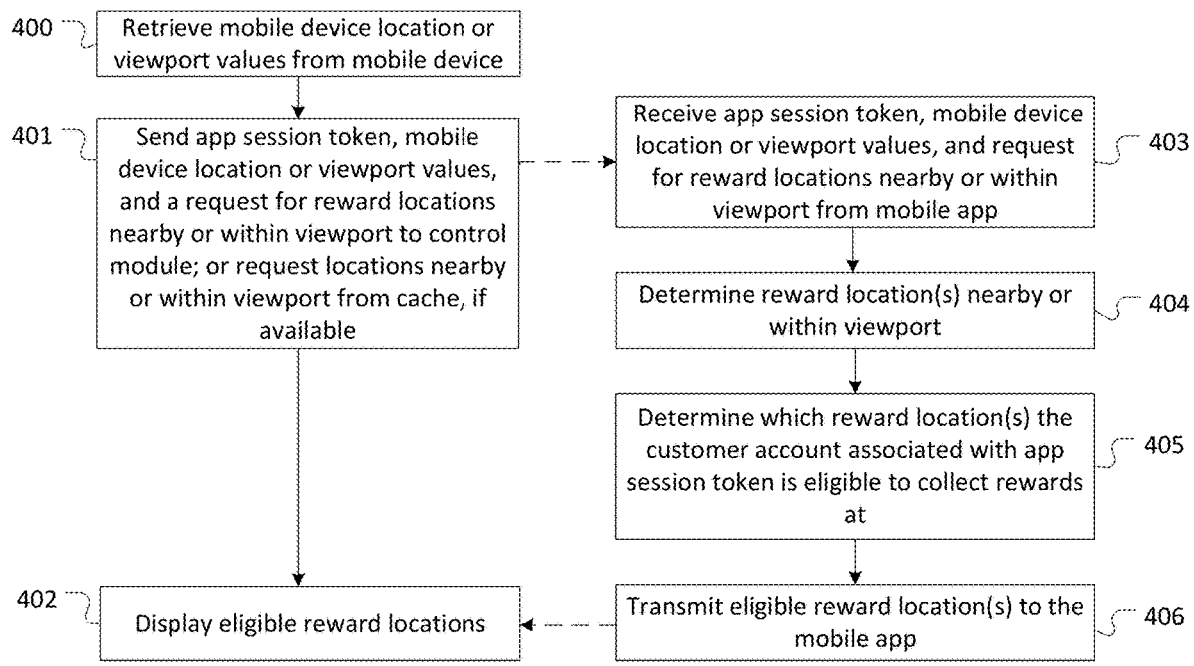
FIG. 18A is a flowchart of a method of obtaining and displaying eligible reward locations performed by a mobile device according to an embodiment of the present invention.
FIG. 18B is a flowchart of a method of determining eligible reward location performed by a control module according to an embodiment of the present invention.

As shown in FIGS. 18A and 18B, retrieval of eligible reward locations is executed by the mobile app (FIG. 18A) and the control module (FIG. 18B). The mobile app may fetch locations based on the mobile devices location or based on the viewport of the map on mobile device. In operation 400, the mobile app retrieves the mobile device's location or the viewport values from the mobile device. Then, in operation 401, if locations need to be retrieved from the control module, the mobile app sends the app session token, the mobile device location or viewpoint port values, and a request for reward locations nearby or within viewport of map to the control module. If nearby reward locations or reward locations within the viewport have been previously retrieved and are already available on the mobile device, the reward locations may be retrieved from cache. In operation 403, control module receives app session token, mobile device location or viewport values, and a request for reward locations nearby or within the viewport from mobile app. Control module, in operation 404, will determine reward locations nearby or within the viewport. Then, in operation 405, control module will determine which of the nearby reward locations the customer account associated with the app session token is eligible to collect rewards at. The eligible reward locations are transmitted to the mobile app in operation 406. In operation 402, the mobile device displays eligible reward locations whether retrieved from the control module or from cache.

Figure 19A:
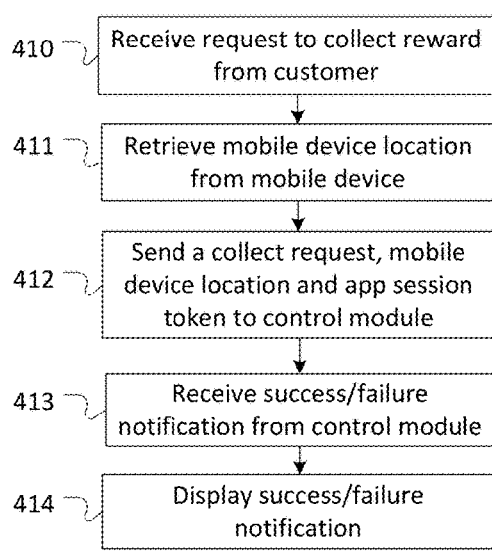
FIG. 19A is a flowchart of a method for collection of rewards performed by a mobile app according to an embodiment of the present invention.
Figure 19B:
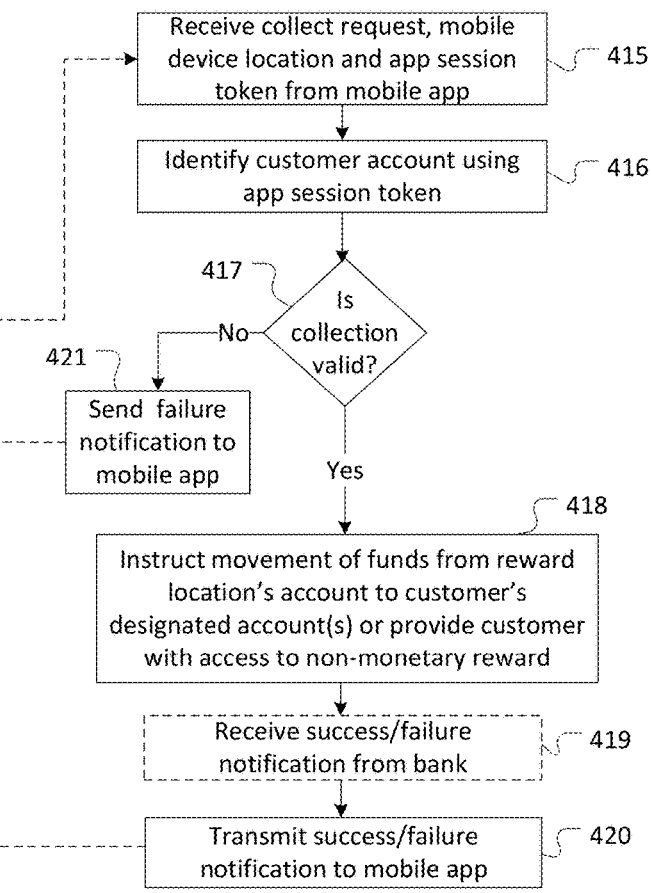
FIG. 19B is a flowchart of a method of collection and validation of rewards performed by a control module according to an embodiment of the present invention.

As shown in FIGS. 19A and 19B, collection and validation of rewards is executed by the mobile app (FIG. 19A) and the control module (FIG. 19B). Once the customer is located at a reward location, customer can request to collect the reward associated with the reward location by opening the mobile app and indicating that he/she wishes to collect such reward. In operation 410, the mobile device receives the request to collect the reward from the customer. The mobile device then, in operation 411, retrieves the mobile device's location from the mobile device. The mobile app sends a collect request, the mobile device's location and the app session token to the control module in operation 412. The control module receives the collect request, the mobile device's location and the app session token from the mobile app in operation 415. The control module uses the app session token to identify the proper customer account in operation 416. In operation 417 the control module compares restrictions on collection of the reward corresponding to the collect request with corresponding information in the customer's account. If it is determined, in operation 417, that the collection is not valid, then, in operation 421, a failure notification is sent to the mobile app. If it is determined, in operation 418, that the collection request is valid, then the control module will instruct bank or other financial institution to move funds from the reward location's account to customer's designated account(s). Alternatively, if the reward is a non-monetary reward, then the control module will provide the customer account with access to the non-monetary reward. If the reward is a monetary reward, in operation 419, the control module receives a success or failure notification from the bank or other financial institution to which instructions were given. The control module will then transmit a success or failure notification to the mobile app in operation 420. The mobile app receives the success or failure notification from the control module in operation 413 and displays the notification in operation 414.

The electronic devices described herein may comprise a processor or other processing circuitry. As used herein, the term 'circuitry' refers to at least all of the following: hardware-only implementations (such as implementations in only analog and/or digital circuitry) and to combinations of circuits and software and/or firmware such as to a combination of processors or portions of processors/software including digital signal processor(s), software, and memory (ies) that work together to cause an apparatus, such as a mobile phone or tablet, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware.

Embodiments of the invention may be implemented in software, hardware, application logic or a combination of software, hardware, and application logic. The software application logic and/or hardware may reside on the apparatus, a separate device, or a plurality of separate devices. If desired, part of the software application logic and/or hardware may reside on the apparatus, part of the software, application logic and/or hardware may reside on a separate device, and part of the software, application logic and/or hardware may reside on a plurality of separate devices. In an example embodiment, the application logic, software, or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer. A computer readable medium may comprise a computer-readable storage medium that may be any tangible media or means that can contain or store the instructions for use by or in connection with an instruction execution system, apparatus, or device, such as a computer.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A system for converting physical currency into digital currency for a cash transaction at a retailer for a given user, the system comprising:
   a mobile device associated with the given user and configured to execute a mobile application;
   a point of sale (POS), located at the retailer, in wireless communication with the mobile application, and configured to
      determine an amount of change due for the cash transaction, and
      receive a given identifier from the mobile application; and a control module, located remotely from retailer, in communication with the mobile application and the POS;
said control module configured to generate a database for a plurality of users, the database comprising a plurality of accounts for the plurality of users, each account comprising associated transaction data for the plurality of users, and a respective identifier;
said control module configured to, when the given user has an associated given account in the database,
receive the amount of change due and the given identifier from the POS,
determine if the given identifier is valid by at least matching the respective identifier in the given account in the database, and
instruct a financial institution in communication with the control module to move the amount of change due from a first bank account to at least one destination bank account;
said control module configured to, during the cash transaction and when the given user has no associated account in the database,
receive a unique device identifier associated with said mobile device,
based upon the unique device identifier, create a provisional account including a unique key, transfer the amount of change due to the provisional account, and
send the unique key to said mobile device; and
said control module configured to, subsequent to the cash transaction and when the given user opens a new account in the database, and uses the unique key, then transfer the amount of change into a new account from the provisional account.

2. The system of claim 1, wherein the control module is further configured to instruct the financial institution to move the amount of change due in accordance with a preference in the given account.

3. The system of claim 1, wherein the first bank account comprises a bank account owned by the retailer.

4. The system of claim 1, wherein the at least one destination bank account comprises a bank account owned by the given user.

5. The system of claim 1, wherein the at least one destination bank account comprises a bank account owned by a partner organization.

6. The system of claim 1, wherein the at least one destination bank account comprises a fee transaction account, a bank account owned by the given user and a bank account owned by a partner organization.

7. The system of claim 1, wherein the control module is further configured to generate the given identifier, and transmit the given identifier to the mobile application.

8. The system of claim 1 wherein said control module is further configured to when the given user has no associated account in the database, transmit a failure notification to said POS.

9. The system of claim 1, wherein said control module is further configured to receive transaction information associated with the cash transaction from said POS, the transaction information comprising at least one of a total amount of the cash transaction, items purchased in the cash transaction, a number of items purchased in the cash transaction, a date of the cash transaction, a time of the cash transaction, a cost of items purchased in the cash transaction, types of payments used in the cash transaction, and amounts paid using each type of payment.

10. The system of claim 9, wherein said control module is further configured to determine the amount of change due based upon comparing the items purchased in the cash transaction to a plurality of available discounts.

11. The system of claim 1, wherein the given identifier comprises a passive identifier.

12. The system of claim 1, wherein the given identifier comprises an active identifier.

13. The system of claim 1, wherein said POS is further configured to receive the given identifier via a scanning operation.

14. The system of claim 1, wherein said POS is further configured to receive the given identifier via a wireless communications operation.

15. The system of claim 1, wherein the unique device identifier associated with said mobile device comprises a universally unique identifier (QUID).

16. A server for converting physical currency into digital currency at a point of sale (POS) for a cash transaction at a retailer for a given user, a mobile device being associated with the given user and configured to execute a mobile application, the POS, located at the retailer, in wireless communication with the mobile application, configured to determine an amount of change due for the cash transaction, and receive a given identifier from the mobile application, the server comprising:
a processor and memory associated therewith and configured to generate a database for a plurality of users, the database comprising a plurality of accounts for the plurality of users, each account comprising associated transaction data for the plurality of users, and a respective identifier;
said processor and memory configured to, when the given user has an associated given account in the database,
receive the amount of change due and the given identifier from the POS,
determine if the given identifier is valid by at least matching the respective identifier in the given account in the database, and
instruct a financial institution in communication with the server to move the amount of change due from a first bank account to at least one destination bank account;
said processor and memory configured to, during the cash transaction and when the given user has no associated account in the database,
receive a unique device identifier associated with said mobile device,
based upon the unique device identifier, create a provisional account including a unique key, transfer the amount of change due to the provisional account, and
send the unique key to said mobile device; and
said processor and memory configured to, subsequent to the cash transaction and when the given user opens a new account in the database, and uses the unique key, then transfer the amount of change into a new account from the provisional account.

17. The server of claim 16, wherein the first bank account comprises a bank account owned by the retailer.

18. The server of claim 16, wherein the at least one destination bank account comprises a bank account owned by the given user.

19. The server of claim 16, wherein the at least one destination bank account comprises a bank account owned by a partner organization.

20. The server of claim 16, wherein the at least one destination bank account comprises a fee transaction account, a bank account owned by the given user and a bank account owned by a partner organization.

21. The server of claim 16, wherein said processor and memory are further configured to generate the given identifier, and transmit the given identifier to the mobile application.

22. The server of claim 16 wherein said processor and memory are further configured to when the given user has no associated account in the database, transmit a failure notification to said POS.

23. The server of claim 16, wherein said processor and memory are further configured to receive transaction information associated with the cash transaction from said POS, the transaction information comprising at least one of a total amount of the cash transaction, items purchased in the cash transaction, a number of items purchased in the cash transaction, a date of the cash transaction, a time of the cash transaction, a cost of items purchased in the cash transaction, types of payments used in the cash transaction, and amounts paid using each type of payment.

24. The server of claim 23, wherein said processor and memory are further configured to determine the amount of change due based upon comparing the items purchased in the cash transaction to a plurality of available discounts.

* * * * *